(12) United States Patent
Shiraishi et al.

(10) Patent No.: US 10,202,127 B2
(45) Date of Patent: Feb. 12, 2019

(54) USER PROFILE-BASED AUTOMATIC PARAMETER TUNING SYSTEM FOR CONNECTED VEHICLES

(71) Applicant: TOYOTA JIDOSHA KABUSHIKI KAISHA, Toyota-shi, Aichi-ken (JP)

(72) Inventors: Shinichi Shiraishi, San Jose, CA (US); Masahiro Yamaura, Toyota (JP); Chung-Wei Lin, Sunnyvale, CA (US)

(*) Notice: Subject to any disclaimer, the term of this patent is extended or adjusted under 35 U.S.C. 154(b) by 294 days.

(21) Appl. No.: 15/159,233

(22) Filed: May 19, 2016

(65) Prior Publication Data

US 2017/0334450 A1 Nov. 23, 2017

(51) Int. Cl.
| | |
|---|---|
| *B60W 50/08* | (2012.01) |
| *H04W 4/80* | (2018.01) |
| *B60W 30/06* | (2006.01) |
| *B60W 30/08* | (2012.01) |

(Continued)

(52) U.S. Cl.
CPC ............ *B60W 50/08* (2013.01); *B60W 30/06* (2013.01); *B60W 30/08* (2013.01); *B60W 30/14* (2013.01);
(Continued)

(58) Field of Classification Search
CPC ............ B60K 35/00; B60K 2350/1004; B60K 2350/1024; B60K 2350/1032;
(Continued)

(56) References Cited

U.S. PATENT DOCUMENTS

| | | | |
|---|---|---|---|
| 2007/0129974 A1* | 6/2007 | Chen | G06Q 10/02 705/5 |
| 2008/0312855 A1* | 12/2008 | Monti | G01R 31/2848 702/64 |

(Continued)

FOREIGN PATENT DOCUMENTS

| | | |
|---|---|---|
| JP | 2009-061978 | 3/2009 |
| JP | 2015-096367 | 5/2015 |

OTHER PUBLICATIONS

Texas Instruments publication, "Paving the way to self driving cars with ADAS", of Aug. 2015, 9 pages.*

(Continued)

*Primary Examiner* — Anne M Antonucci
*Assistant Examiner* — Sanjeev Malhotra
(74) *Attorney, Agent, or Firm* — Burbage Law, P.C.; Jon-Michael Burbage; Elizabeth Ruzich

(57) ABSTRACT

The disclosure includes implementations for modifying an operation of an Advanced Driver Assistance System ("ADAS system") of a vehicle based on one or more preferences of a user for the operation of the ADAS system. Some implementations of a method may include receiving a wireless message from a wireless network. The wireless message may include optimization settings data describing how to modify an operation of the ADAS system of the vehicle based on one or more preferences of a user for the operation of the ADAS system. The user may include a human who has reserved the vehicle for their use. The method may include modifying one or more control parameters of the ADAS system based on the optimization settings data so that the operation of the ADAS system conforms with the one or more preferences of the user for the operation of the ADAS system.

20 Claims, 10 Drawing Sheets

(51) Int. Cl.
*B60W 30/14* (2006.01)
*G05D 1/00* (2006.01)
*H04L 12/58* (2006.01)
*H04L 29/08* (2006.01)
*H04L 29/06* (2006.01)

(52) U.S. Cl.
CPC ........... *G05D 1/0088* (2013.01); *H04L 51/18* (2013.01); *H04L 67/12* (2013.01); *H04L 67/306* (2013.01); *H04L 67/38* (2013.01); *H04W 4/80* (2018.02)

(58) Field of Classification Search
CPC ...... B60K 2350/106; B60K 2350/1096; B60K 2350/352; B60K 2350/901; B60K 2350/903; B60K 2350/906; B60K 2350/962; B60K 2350/967; B60K 37/06; H04W 4/046; H04W 4/50; B60W 50/14; B60W 2420/42; B60W 30/02; B60W 30/143; B60W 30/18163; B60R 1/00; G06F 1/1632; G06F 2200/1635; G08G 1/0112; G08G 1/0145; G08G 1/07; H04M 2250/02; H04M 1/6091; H04M 1/72577
USPC ....... 701/41; 455/414.3, 418; 705/5; 702/64; 348/38
See application file for complete search history.

(56) References Cited

U.S. PATENT DOCUMENTS

| | | | | |
|---|---|---|---|---|
| 2014/0106726 | A1* | 4/2014 | Crosbie | H04W 4/046 455/418 |
| 2015/0099495 | A1* | 4/2015 | Crosbie | B60W 50/14 455/414.3 |
| 2016/0159349 | A1* | 6/2016 | Jo | B60R 1/00 701/41 |
| 2016/0214620 | A1* | 7/2016 | Yang | B60W 40/13 |
| 2016/0381323 | A1* | 12/2016 | Garcia, III | G06T 19/006 348/38 |
| 2017/0015318 | A1* | 1/2017 | Scofield | G08G 1/0112 |
| 2017/0158133 | A1* | 6/2017 | Chundrlik, Jr. | B60R 1/00 |
| 2017/0161569 | A1* | 6/2017 | Ren | G06K 9/00798 |
| 2017/0178506 | A1* | 6/2017 | Witte | G08G 1/0112 |
| 2017/0291542 | A1* | 10/2017 | Dakroub | B60Q 9/00 |
| 2017/0298849 | A1* | 10/2017 | Be | F02N 11/0814 |

OTHER PUBLICATIONS

Uber and Lyft Start Service at Phoenix AZ Airport, 4 pages, published Jun. 17, 2016, stating that Uber and Lyft were founded 5 years ago (of the published date).*

* cited by examiner

Runtime

User Preference Data
112

Simulation
Model Library
399

Example Roadway Models 700 of the Simulation Model Library 399

Reservation Data
198

1. Vehicle ID;
2. User ID; and
3. Reservation Time
4. (Optional) User Preferences for ADAS.

USER PROFILE-BASED AUTOMATIC PARAMETER TUNING SYSTEM FOR CONNECTED VEHICLES

BACKGROUND

The specification relates to tuning a vehicle control system for a connected vehicle based on a user profile for a driver and the characteristic behavior of the vehicle. The vehicle may have a plurality of drivers and the vehicle control system may be tuned differently for the different drivers.

Vehicles increasingly include vehicle control systems. For example, a vehicle may be an autonomous vehicle or include an Advanced Driver Assistance System (herein an "ADAS system" if singular or "ADAS systems" if plural).

ADAS systems are frequently included in vehicles that are used for car-rental business or car sharing services. Although ADAS systems improve vehicle safety, the default control parameter settings for ADAS systems is not always comfortable for all users. This is especially true in situations where a vehicle may have many different drivers (e.g., car-rental businesses, car-sharing services, etc.). For example, some users may consider a setting for an ADAS system to be "too quick," "too slow," "too close" or "too far." This may make the user feel uncomfortable or unsafe when driving the vehicle with the ADAS system operating. If a user feels uncomfortable (or unsafe) because of the operation of an ADAS system, the user will likely deactivate the ADAS system and never use it again.

SUMMARY

Described are implementations that include a system, method and computer program product for modifying one or more control parameters of an ADAS system so that the operation of the ADAS system is customized based on the operational preferences of a particular user (or driver) of a vehicle that includes the ADAS system.

A customization system may include (1) an optimization engine that is operable on a cloud server and (2) a customization client that is operable on a vehicle. The cloud server and the vehicle may be communicatively coupled to a network (e.g., 3G, 4G, LTE, VoLTE, Wi-Fi™, etc.). The vehicle may be operable to send and receive messages via the network. In this way, the vehicle may be a "connected vehicle." The vehicle may include an ADAS system.

In some implementations, the cloud server may store at least two types of data that are used to customize the ADAS system for a particular vehicle based on the preferences of a particular driver.

First, the cloud server may store an inventory that describes one or more vehicle models that it can customize. Each vehicle model may be identified by a vehicle ID or some other unique identifier. The cloud server may store different "vehicle characteristic data" for each vehicle model. The ADAS systems for different vehicle models may operate differently. For example, some may cause the vehicle to accelerate faster relative to other ADAS systems. This is an example of a characteristic operation for a particular vehicle model. Other examples are possible as an ADAS system controls various variables for their vehicle, and each of these variables may operate differently for different vehicle models, thereby creating a "characteristic operation" for the ADAS systems of different vehicle models. The vehicle characteristics data may describe the characteristic operation of the ADAS system for a particular vehicle model.

Second, users may have their own "user preference data" that is stored by the cloud server describes one or more of their preferences for the operation of the ADAS system in the vehicle that they are driving (see, e.g., FIG. 5). A user may input their user preference data, for example, via an application running on a personal processor-based computing device (e.g., a smartphone, a smartwatch, a laptop, etc.) or at the time a vehicle reservation is made (e.g., a vehicle reserved for car rental via a browser of a computer).

The optimization engine may combine these the vehicle characteristic data and the user preference data to automatically generate optimal parameter settings. The optimal parameter settings may include digital data that describes how one or more control parameters of an ADAS system for a particular vehicle model should be modified for use by a particular user. The optimization engine may provide the optimal parameter settings to the network. The customization client of a vehicle may receive the optimal parameter settings from the network prior to the vehicle's scheduled use by a particular user. The customization client may modify one or more control parameters of the ADAS system of the vehicle based on the optimal parameter settings.

For example, if a user has reserved a model year 2015 Toyota Corolla at 2:00 PM, the optimization engine may provide the optimal parameter settings for the 2015 Toyota Corolla to a customization client of the vehicle at 1:50 PM. A customization client operable in the 2015 Toyota Corolla may modify the control parameters for the ADAS system of that vehicle so that the ADAS system is customized and ready for the user at the time of their appointment, 2:00 PM.

Example implementations of the optimization system are now described.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of a vehicle including an ADAS system and a communication unit, the method including: receiving, by the communication unit of the vehicle, a wireless message from a wireless network, where the wireless message includes optimization settings data describing how to modify an operation of the ADAS system of the vehicle based on one or more preferences of a first user for the operation of the ADAS system, where the first user has reserved the vehicle for their use; and modifying, by a processor of the vehicle, one or more control parameters of the ADAS system based on the optimization settings data so that the operation of the ADAS system conforms with the one or more preferences of the first user. Other embodiments of this aspect include corresponding computer systems, apparatus, and computer programs recorded on one or more computer storage devices, each configured to perform the actions of the methods.

Implementations may include one or more of the following features. The method where the wireless message is received via dedicated short range communication. The method where the optimization settings data include one or more new control parameters for the ADAS system and modifying the one or more control parameters of the ADAS system includes replacing the one or more control parameters of the ADAS system with the one or more new control parameters. The method where the one or more control parameters are modified based on the first user's preference for a velocity of the vehicle. The method where the one or more control parameters are modified based on the first user's preference for an acceleration of the vehicle. The method where the one or more control parameters are modified based on the first user's preference for a breaking of the vehicle. The method where the one or more control parameters are modified based on the first user's preference for a deceleration of the vehicle. The method where the one or more control parameters are modified based on the first user's preference for a separation distance of the vehicle relative to another object on a roadway being traveled by the vehicle. The method where the ADAS system is an adaptive cruise control system. The method where the ADAS system is an automatic parking system. The method where the ADAS system is an emergency driver assistant. The method where the ADAS system is a collision avoidance system. The method where the ADAS system is a vehicle control system that makes the vehicle an autonomous vehicle. The method further including receiving, by the communication unit, a second wireless message including second optimization settings data describing how to modify the operation of the ADAS system of the vehicle based on one or more preferences of a second user who has reserved the vehicle for use by the second user at a time when the vehicle is not reserved for use by the first user, and modifying, by the processor of the vehicle, the one or more control parameters of the ADAS system based on the second optimization settings data so that the operation of the ADAS system conforms with the one or more preferences of the second user for the operation of the ADAS system. The method where the first user reserves the vehicle using a reservation service. The method where the reservation service is associated with a vehicle rental service that has rented the vehicle to the first user. The method where the reservation service is associated with a vehicle sharing service that has rented the vehicle to the first user. The method where the optimization settings data are determined by an optimization engine operating on a cloud server that is communicatively coupled to the wireless network and the optimization engine determines the optimization settings based on (1) vehicle characteristics data describing a characteristic operation of the ADAS system for a particular model of the vehicle and (2) user preferences data received by the optimization engine from the reservation service, where the user preferences data describes the one or more preferences of the first's user for the operation of the ADAS system. Implementations of the described techniques may include hardware, a method or process, or computer software on a computer-accessible medium.

One general aspect includes a computer program product of a vehicle including a non-transitory memory storing computer-executable code that, when executed by a processor of the vehicle, causes the processor to: receive a wireless message from a wireless network, where the wireless message includes optimization settings data describing how to modify an operation of an ADAS system of the vehicle based on one or more preferences of a user who has reserved the vehicle for their use at a start time, where the one or more preferences describe the first's user's preferences for the operation of the ADAS system; monitor a current time relative to the start time; modify one or more control parameters of the ADAS system based on the optimization settings data so that the operation of the ADAS system conforms with the one or more preferences of the user for the operation of the ADAS system, where the one or more control parameters are modified based on the optimization settings data prior to the start time. Other embodiments of this aspect include corresponding computer systems, apparatus, and computer programs recorded on one or more computer storage devices, each configured to perform the actions of the methods.

One general aspect includes a system including: a vehicle including a processor; a communication unit communicatively coupled to the processor; and an ADAS system communicatively coupled to the processor and the communication unit; where the ADAS system is operable to control an operation of the vehicle based on one or more control parameters of the ADAS system; where the communication unit receives a wireless message from a wireless network; where the wireless message includes optimization settings data describing how to modify an operation of the ADAS system based on one or more preferences of a user who has reserved the vehicle for their use; where the one or more preferences describe the user's preferences for the operation of the ADAS system; and where, responsive to receipt of the wireless messing including the optimization settings data, the processor modifies the one or more control parameters of the ADAS system based on the optimization settings data so that the operation of the ADAS system conforms with the one or more preferences of the user for the operation of the ADAS system. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
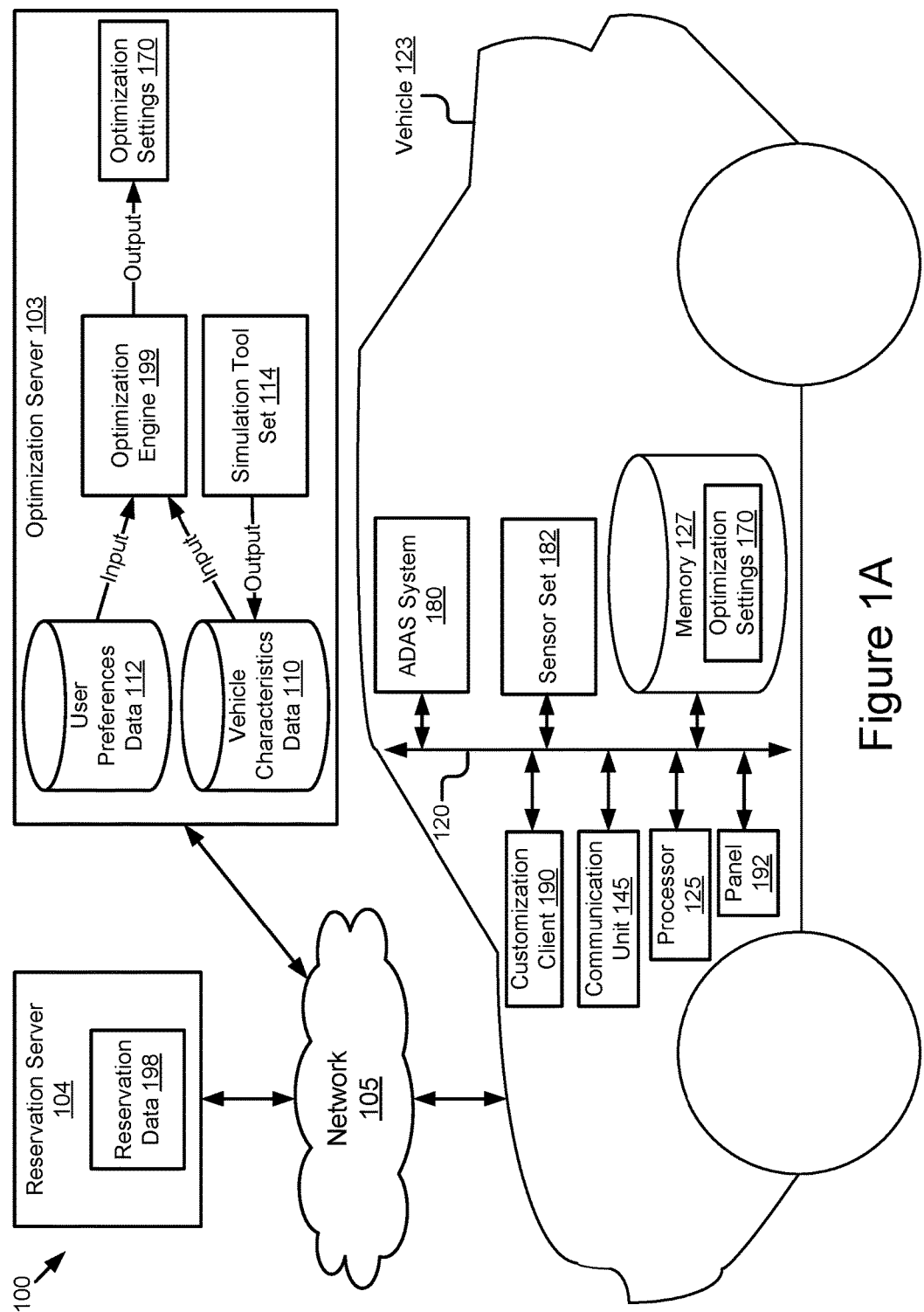
FIG. 1A is a block diagram illustrating an operating environment for an optimization system according to some implementations.

An automotive system may include a vehicle. Vehicles increasingly include vehicle control systems. For example, a vehicle may be an autonomous vehicle or include an Advanced Driver Assistance System (herein an "ADAS system").

Examples of ADAS systems include the following: adaptive cruise control; lane trace control; lane change assistance; and etc. These systems are frequently included in vehicles that are used for car-rental business or car sharing services.

Although ADAS systems improve vehicle safety, the default control parameter settings for ADAS systems is not always comfortable for all users. This is especially true in situations where a vehicle may have many different drivers (e.g., families with many drivers but only one car, car-rental businesses, car-sharing services, etc.). For example, some users may consider a setting for an ADAS system to be "too quick," "too slow," "too close" or "too far." This may make the user feel uncomfortable or unsafe when using the ADAS system. If a user feels uncomfortable (or unsafe) because of the operation of an ADAS system, the user will likely deactivate the ADAS system and never use it again.

In some implementations, the optimization system described herein beneficially solves this problem by automatically modifying one or more control parameters for the ADAS system of a particular vehicle to suit the preferences of a particular user. The optimization system may operate on the fly so that the control parameters for the ADAS system may be automatically modified many times throughout the day based on the preferences of different users.

In some implementations, the optimization system may beneficially enable drive-time customization of an ADAS system for a particular vehicle based on the preferences of a particular user.

In some implementations, the optimization system may be useful for any vehicle that has multiple drivers, such as families having multiple drivers but one car, car-rental businesses or car-sharing services.

A customization system may include: (1) an optimization engine that is operable on a cloud server; and (2) a customization client that is operable on a vehicle.

The cloud server and the vehicle may be communicatively coupled to a network. The network may include, for example, one or more of the following, or any derivative thereof: 3G; 4G; LTE; VoLTE; Wi-Fi™; Dedicated Short Range Communication ("DSRC"); and full-duplex wireless communication as described in U.S. patent application Ser. No. 14/471,387 filed on Aug. 28, 2014 and entitled "Full-Duplex Coordination System," the entirety of which is hereby incorporated by reference.

The vehicle may be operable to send and receive messages via the network. In this way, the vehicle may be a "connected vehicle." The vehicle includes an ADAS system.

In some implementations, the optimization engine may operate on the fly so that the control parameters for the ADAS system may be automatically modified one or more times throughout the day based on the preferences of different drivers of the vehicle.

In some implementations, the customization system may enable drive-time customization of an ADAS system based on the preferences of a particular user. The customization system may beneficially enable the vehicle to be used by a plurality of different users having different preferences about how the ADAS system for the vehicle should be tuned. Accordingly, the customization system will beneficially improve the performance for any vehicle that has multiple drivers by customizing the operation of the ADAS system based on the preferences of the different drivers regarding the operation of the ADAS system. This example functionality of the customization system may be particularly beneficial for families having multiple drivers but one car, car-rental businesses or car-sharing services.

For example, if a user has reserved a model year 2015 Toyota Corolla at 2:00 PM, the optimization engine may provide the optimal parameter settings for the 2015 Toyota Corolla to a customization client of the vehicle at 1:50 PM. A customization client operable in the 2015 Toyota Corolla may modify the control parameters for the ADAS system of that vehicle so that the ADAS system is customized and ready for the user at the time of their appointment, 2:00 PM.

In some implementations, the cloud server may store at least two types of data that are used to customize the ADAS system for a particular vehicle based on the preferences of a particular driver: (1) vehicle characteristic data; and (2) user preference data. Each are described below according to some example implementations.

Example Vehicle Characteristic Data

The cloud server may store an inventory that describes one or more vehicle models that it can customize. Each vehicle model may be identified by a vehicle ID or some other unique identifier. A vehicle model may include its own "vehicle characteristic data" that describes the characteristic operation of the ADAS system for this vehicle model. In other words, the ADAS systems for different vehicle models may operate differently. For example, some ADAS systems may cause a vehicle to driver faster than other ADAS systems. In another example, some ADAS systems may cause a vehicle to wait longer before braking than other ADAS systems. In yet another example, some ADAS systems brake more suddenly when stopping than other ADAS systems. These are only representative examples. Accordingly, for a single driver, the ADAS systems for the different vehicle models must be tuned differently to accommodate the preferences for that driver.

Example implementations for a vehicle model are described in U.S. patent application Ser. No. 15/053,945 filed on Feb. 25, 2016 and entitled "Graphical User Interface System for Displaying a Parametric Modification of a Vehicle Model," the entirety of which is herein incorporated by reference.

In some implementations, the optimization engine may include one or more Modelica-based modeling tools. In some implementations, the modeling tools may include a parametric exploration tool ("PET") and a design space exploration ("DSE") tool. Example modeling tools may include one or more of the following modeling tools: Dymola developed by Dassault Systemes AB of Sweden; OpenMETA developed by Vanderbilt University; Simulink developed by MathWorks of Natick, Mass.; and ADAMS developed by MSC Software Corp. of Newport Beach Calif. The optimization engine may use one or more of these modeling tools to generate a digital model that represents a particular vehicle model that includes an ADAS system.

In some implementations, the optimization engine may also include a game engine such as Unity developed by Unity Technologies of San Francisco, Calif., or some other game engine. The optimization engine may use the game engine to run one or more simulations for measuring the performance of the ADAS system represented by the digital model generated by the one or more modeling tools.

In some implementations, the optimization engine may use one or more modeling tools and the game engine to determine the vehicle characteristics data for each vehicle model. For example, the optimization engine may use the modeling tools to generate a digital model for a particular vehicle model (e.g., a 2015 Toyota Corolla, a 2013 Toyota Prius, etc.) that includes an ADAS system. The digital model may be provided to the game engine. The game engine may generate a digital version of the vehicle based on the digital model (e.g., a digital version of the 2015 Toyota Corolla, a digital version of the 2013 Toyota Prius, etc.). The game engine may also generate a digital simulation environment for testing the performance of the digital version of the vehicle. The digital version of the vehicle may be driven in the simulation environment.

The digital simulation may include various realistic driving scenarios. The digital version of the vehicle may be driven in the digital simulation over hundreds, thousands or millions of miles so that the characteristic operation of the ADAS system for the vehicle model may be determined (e.g., the characteristic operation of the ADAS system included in the 2015 Toyota Corolla, the characteristic operation of the ADAS system included in the 2013 Toyota Prius, etc.). In this way, the vehicle characteristic data for that particular vehicle model may be generated and stored in a non-transitory memory of the cloud server.

In some implementations, this process may be repeated for each vehicle model that has been assigned a vehicle ID by the optimization engine. In this way the vehicle characteristic data for each vehicle that has an assigned vehicle ID may be determined.

Figure 3:
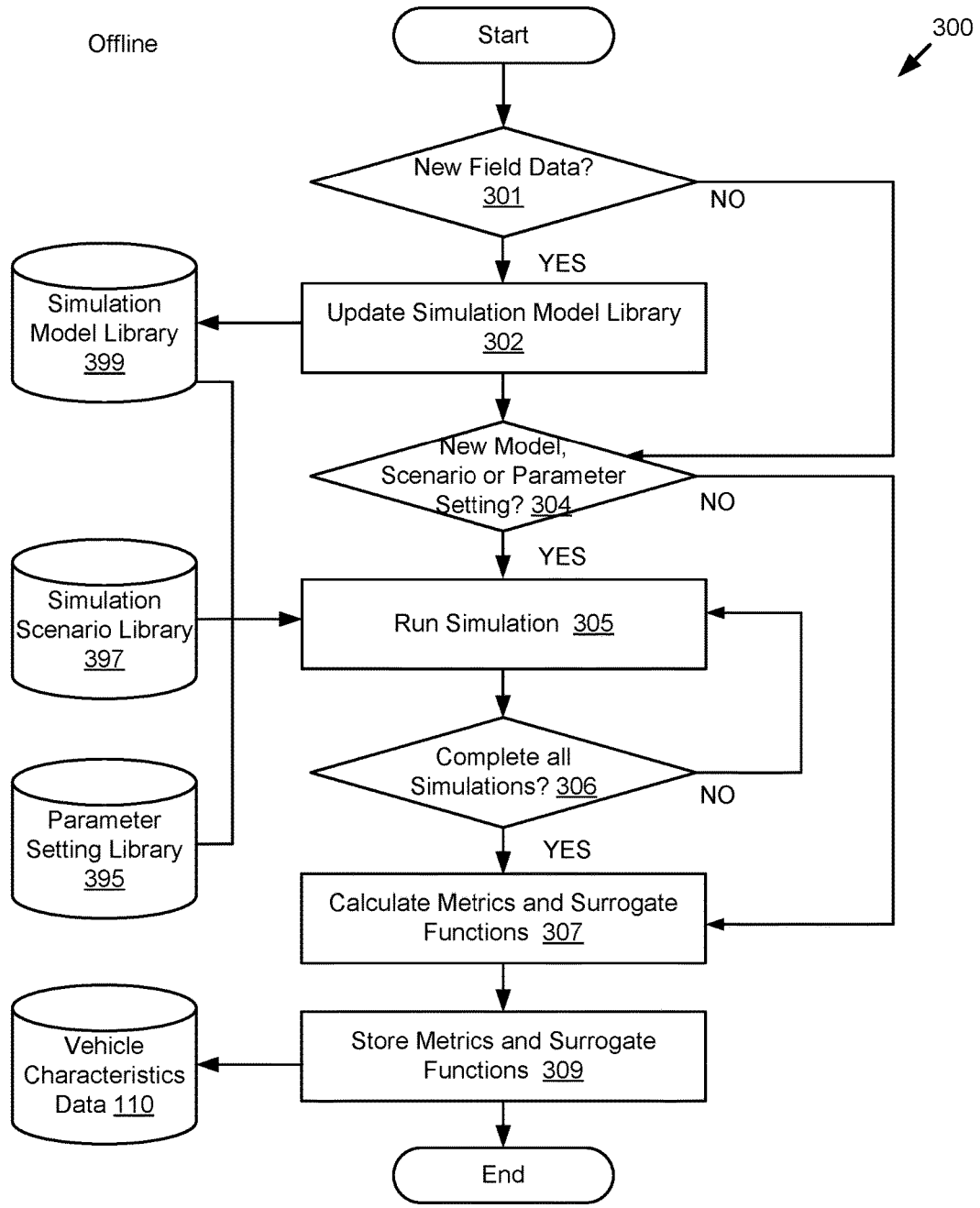
FIG. 3 is a flowchart of an example method for determining vehicle characteristic data according to some implementations.

An example implementation of an offline method for generating vehicle characteristic data is shown in FIG. 3.

Example User Preference Data

Figure 5:
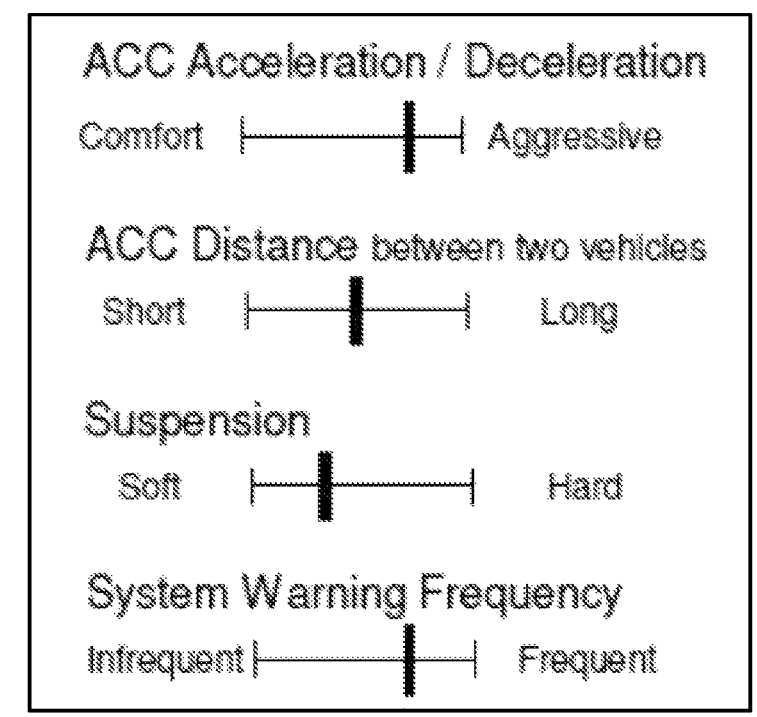
FIG. 5 is a block diagram illustrating an example of user preference data according to some implementations.

Different users may have their own "user preference data" that is stored by the cloud server. The user preference data may describe one or more user preferences for the operation of an ADAS system in a vehicle that is being driven by the user. An example implementation of the user preference data is shown in FIG. 5.

A user may input their user preference data, for example, via an application running on a personal processor-based computing device (e.g., a smartphone, a smartwatch, a laptop, etc.) or at the time a vehicle reservation is made (e.g., a vehicle reserved for car rental via a browser of a computer).

Example Optimal Parameter Setting

In some implementations, the vehicle characteristic data and the user preference data may be stored by the cloud server in a non-transitory memory.

In some implementations, the optimization engine of the cloud server may combine these the vehicle characteristic data and the user preference data to automatically generate optimal parameter settings for an individual user prior to the user's schedule use of a particular vehicle. The optimal parameter settings may include digital data that describes how one or more control parameters of an ADAS system for a particular vehicle model should be modified for use by a particular user. The optimization engine may provide the optimal parameter settings to the network.

In some implementations, a customization client of a vehicle may receive the optimal parameter settings from the network prior to the vehicle's scheduled use by a particular user. The customization client may modify one or more control parameters of the ADAS system of the vehicle based on the optimal parameter settings.

Referring now to FIG. 1A, depicted is a block diagram illustrating an operating environment 100 for an optimization system according to some implementations. The optimization system may include the optimization engine 199 included in an optimization server 103 and the customization client 190 included in a vehicle 123.

In some implementations, the operating environment 100 may include one or more of the following elements: the vehicle 123; a reservation server 104; and the optimization server 103. These elements may be communicatively coupled to a network 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some implementations, the network 105 may include a peer-to-peer network. The network 105 may also be coupled to or may include portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include third-generation (3G), fourth-generation (4G), long-term evolution (LTE), Voice-over-LTE ("VoLTE") or any other mobile data network or combination of mobile data networks. Further, the network 105 may include one or more IEEE 802.11 wireless networks.

In some implementations, the network 105 may include one or more communication channels shared among the vehicle 123 and one or more other wireless communication devices. The communication channel may include DSRC, full-duplex wireless communication or any other wireless communication protocol. For example, the network 105 may be used to transmit a DSRC message, DSRC probe or basic safety message to a vehicle 123.

The vehicle 123 may include a car, a truck, a sports utility vehicle, a bus, a semi-truck, a drone or any other roadway-based conveyance that includes a communication unit 145 and an ADAS system 180. In some implementations, the vehicle 123 may include an autonomous vehicle or a semi-autonomous vehicle.

The vehicle 123 may include one or more of the following elements: a communication unit 145; an ADAS system 180; a processor 125; a memory 127; a customization client 190; a sensor set 182; and a panel 192. These elements may be communicatively coupled to one another via a bus 120.

The communication unit 145 may include hardware that transmits and receives data to and from the network 105. In some implementations, the communication unit 145 includes a port for direct physical connection to the network 105 or to another communication channel. For example, the communication unit 145 includes a USB, SD, CAT-5, or similar port for wired communication with the network 105. In some implementations, the communication unit 145 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 145 includes a port for direct physical connection to the network 105 or to another communication channel. For example, the communication unit 145 includes a USB, SD, CAT-5, or similar port for wired communication with the network 105.

In some implementations, the communication unit 145 includes a wireless transceiver for exchanging data with the network 105 or other communication channels using one or more wireless communication methods, including: IEEE 802.11; IEEE 802.16, Bluetooth; EN ISO 14906:2004 Electronic Fee Collection—Application interface EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some implementations, the communication unit 145 may include a dull-duplex coordination system as described in U.S. patent application Ser. No. 14/471,387 filed on Aug. 28, 2014 and entitled "Full-Duplex Coordination System."

In some implementations, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The ADAS system 180 may include one or more advanced driver assistance systems. The ADAS system 180 may include or be communicatively coupled to a non-transitory memory that stores one or more control parameters that describe, define or affect how the ADAS system 180 operates in different scenarios as described by sensor data collected by the sensor set 182. The customization client 190 may be communicatively coupled to the ADAS system 180 (e.g., via the bus 120) to access the non-transitory memory of the ADAS system 180 and modify the control parameters of the ADAS system 180. For example, the customization client 190 may modify the control parameters based on the optimization settings 170.

In some implementations, the control parameters of the ADAS system 180 are stored in the memory 127. In some implementations, the memory 127 may be an element of the ADAS system 180. In some implementations, the vehicle 123 may include a first memory 127 that stores the optimization settings 170 and the ADAS system 180 may include a second memory 127 that stores the control parameters of the ADAS system 180.

Examples of an ADAS system 180 may include one or more of the following elements of a vehicle 123: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The processor 125 includes an arithmetic logic unit, a microprocessor, a general purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1A includes a single processor 125, multiple processors may be included. The processor 125 may include a graphical processing unit. Other processors, operating systems, sensors, displays, and physical configurations may be possible.

In some implementations, the processor 125 may be an element of an onboard vehicle computer or electronic control unit of the vehicle 123.

The memory 127 stores instructions or data that may be executed by the processor 125. The instructions or data may include code for performing the techniques described herein. The memory 127 may be a dynamic random access memory (DRAM) device, a static random access memory (SRAM) device, flash memory, or some other memory device. In some implementations, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 1, the memory 127 stores the optimization settings 170. The optimization settings 170 may include digital data describing how one or more control parameters of the ADAS system 180 should be modified so that the ADAS system 180 operates in accordance with one or more preferences of a user of the vehicle 123 (e.g., a driver).

In some implementations, the memory 127 may store one or more of the following: the customization client 190; one or more software elements of the ADAS system 180; sensor data collected by the sensor set 182; and graphical data for causing the panel 192 to display one or more graphical user interfaces ("GUI" if singular, "GUIs" if plural).

The customization client 190 may include code and routines that are operable, when executed by the processor 125, to cause the processor 125 to perform one or more of the following steps: receive the optimization settings 170 from the network 105; store the optimization settings 170 in the memory 127; identify the control parameters for the ADAS system 180; modify the control parameters based on the optimization settings 170 so that they are consistent with the optimization settings 170; provide a message to the optimization server 103 via the network 105 to indicate the vehicle 123 is customized for a particular user; generate graphical data for causing the panel 192 to display a GUI upon the vehicle 123 being powered on, wherein the GUI includes a message describing the vehicle 123 as being customized for a particular user; and providing the graphical data to the panel 192.

The customization client 190 may include a thin client that is executed by an infotainment system of the vehicle 123 or some other processor-based computing device of the vehicle 123.

In some implementations, the customization client 190 may be implemented using hardware including a field-programmable gate array ("FPGA") or an application-specific integrated circuit ("ASIC"). In some other implementations, the customization client 190 may be implemented using a combination of hardware and software. The customization client 190 may be stored in a combination of the devices (e.g., servers or other devices), or in one of the devices.

In some implementations, the sensor set 182 may include one or more sensors. The sensor set 182 may collect sensor data. The sensor data may describe, for example, a physical environment of the vehicle 123. The ADAS system 180 may modify the operation of the vehicle 123 or control the operation of the vehicle 123 based on one or more of the following elements: (1) the sensor data; and (2) the control parameters of the ADAS system 180.

In some implementations, the sensor set 182 may include one or more sensors that are operable to measure the physical environment outside of the vehicle 123. For example, the sensor set 182 may record one or more physical characteristics of the physical environment that is proximate to the vehicle 123. The one or more physical characteristics may be recorded directly (e.g., atmospheric pressure, temperature, or any other parameters capable of direct measurement by a vehicle sensor) or indirectly (e.g., an image or sound recording that depicts or describes a physical characteristic of the vehicle environment or an object or event present within the vehicle environment).

In some implementations, the sensor set 182 may include one or more sensors that are operable to measuring the performance of the vehicle 123. For example, the sensor set 182 may record sensor data that describes a speed or acceleration of the vehicle 123.

In some implementations, the sensor set 182 may include one or more of the following vehicle sensors: an external microphone; an internal microphone; an external camera; an internal camera; a LIDAR sensor; a laser altimeter; a navigation sensor (e.g., a global positioning system sensor of the DSRC-compliant GPS unit that is accurate to within 1.5 meters, as opposed to being accurate to within 10 meters as is the case for non-DSRC-compliant GPS units); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 182 may be operable to record sensor data that describes one or more locations of the vehicle 123 at one or more different times, images or other measurements of the vehicle environment and objects or other vehicles present in the vehicle environment, etc. The vehicle environment may include the area outside of the vehicle 123 that is proximate to the vehicle 123. For example, the vehicle 123 may be in motion on a roadway and the vehicle environment may include other vehicles that are in front of the vehicle 123, behind the vehicle 123, beside the vehicle 123 or one or more car lengths away from the vehicle 123. The sensor data may be included in the supervisor data 197.

In some implementations, the sensor data may be used to determine the vehicle state. For example, if the sensor data includes images or other data that indicates that the vehicle 123 is present around other vehicles or other obstacles which may be struck by the vehicle 123 due in part to the operation of the ADAS system 180, thereby causing the ADAS system 180 to choose to operate the vehicle 123 more conservatively to prevent a collision (e.g., slower speeds, slower acceleration, turning or vehicle steering that is more predictable by other drivers, etc.).

The panel 192 may include an electronic display panel or monitor of the vehicle 123. For example, the panel 192 may include an electronic display panel of a head-unit or heads-up display unit of the vehicle 123.

The heads-up display unit may include a three-dimensional heads-up display unit such as the one described in U.S. patent application Ser. No. 15/080,433 filed on Mar. 24, 2016 and entitled "Wireless Data Sharing Between a Mobile Client Device and a Three-Dimensional Heads-Up Display Unit," the entirety of which is herein incorporated by reference.

The reservation server 104 may include a hardware server. The reservation server 104 may include any processor-based computing device that is executing server software.

In some implementations, the reservation server 104 may provide a service whereby users may schedule an appointment for driving a vehicle 123. For example, the reservation server 104 may be operated by a car rental service, a car sharing service, a ride sharing service or some other service whereby a plurality of users may schedule appointments to drive a vehicle such as the vehicle 123.

The reservation data 198 may include the data that is provided by a user to schedule an appointment for driving a vehicle 123. The reservation data 198 may be stored in a non-transitory memory of the reservation server 104.

The reservation data 198 may include digital data that describes one or more of the following elements of the reservation data 198: a vehicle ID that uniquely identifies a vehicle model that is being reserved (e.g., the model of the vehicle 123); a user ID that uniquely identifies the user who is reserving the vehicle; a time or range of times (e.g., start time and end time) when the vehicle associated with the vehicle ID is reserved for use by the user associated with the user ID; and one or more user preferences for configuring an ADAS system of the vehicle that is being reserved (e.g., user preferences for customizing one or more control parameters for the ADAS system 180 of the vehicle 123).

In some implementations, the preferences of the user may be expressed (and not inferred) at the time of reservation or some other time. For example, the reservation server 104 may cause a panel viewable by the user to display a GUI which may be used by the user to input their preferences for the operation of the ADAS system of the vehicle being reserved by the user. These preferences may be included in the reservation data 198. As described in more detail below, in some implementations the reservation server 104 may provide the reservation data 198 to the optimization server 103 so that the vehicle 123 may be customized for the user prior to the time of their reservation as may be described by the reservation data 198.

Figure 9:
FIG. 9 is a block diagram illustrating an example of reservation data according to some implementations.

An example of the reservation data 198 is shown in FIG. 9 according to some implementations.

The optimization server 103 may include a hardware server. The optimization server 103 may include any processor-based computing device that is executing server software.

In some implementations, the optimization server 103 may provide a service whereby particular vehicles such as vehicle 123 that are reserved for user by a user via the reservation service provided by the reservation server 104 are customized for a particular user based on the preferences of the user. For example, the optimization server 103 may be operated by a car rental service, a car sharing service, a ride sharing service or some other service whereby a plurality of users may schedule appointments to drive a vehicle such as the vehicle 123.

In some implementations, the optimization server 103 may be operated by the same entity that operates the reservation server 104 or a different entity.

The optimization server 103 may include one or more of the following elements: a simulation tool set 114; vehicle characteristics data 110; user preferences data 112; an optimization engine 199; and optimization settings 170.

In some implementations, the optimization server 103 may include a non-transitory memory similar to memory 127 that stores one or more of the following elements: the simulation tool set 114; the vehicle characteristics data 110; the user preferences data 112; the optimization engine 199; and the optimization settings 170.

In some implementations, the optimization engine 199 may include code and routines that may be operable, when executed by the processor of the optimization server 103 (e.g., the processor 225 described below for FIG. 2), to cause the processor to assign a vehicle ID to a plurality of different vehicle models. A vehicle ID may be a unique identifier of a particular model of a vehicle. For example, the optimization engine 199 may assign a vehicle ID to the 2015 Toyota Prius that is different from the vehicle ID that is assigned to the 2014 Toyota Tacoma, as well as an any other vehicle model that is assigned a vehicle ID by the optimization engine 199.

In some implementations, the vehicle ID may be stored on the non-transitory memory of the optimization server 103 (e.g., the memory 227 described below with reference to FIG. 2). For example, the vehicle ID may be stored in a data structure that includes one or more sets of vehicle characteristics data 110 that are each associated with a particular vehicle ID.

In some implementations, a data structure of the optimization server 103 may include a plurality of different sets of vehicle characteristics data 110 that are indexed based on the vehicle IDs so that each set of vehicle characteristics data 110 may be retrieved from the data structure by the optimization engine 199 querying the data structure using a vehicle ID, which will cause the data structure to return a set of vehicle characteristics data 110 this is associated with the vehicle ID included in the query.

In some implementations, the optimization engine 199 may include code and routines that may be operable, when executed by the processor of the optimization server 103, to cause the processor to build the data structure including the plurality of sets of vehicle characteristics data 110 indexed based on a plurality of vehicle IDs assigned by the optimization engine 199.

In some implementations, the plurality of vehicle IDs may form an inventory of the different vehicles 123 which the optimization engine 199 may customize. For example, the optimization engine 199 may customize each vehicle model which it assigns a vehicle ID.

In some implementations, the optimization engine 199 may include code and routines that may be operable, when executed by the processor of the optimization server 103, to cause the processor to assign a user ID to a plurality of different users. A user ID may be a unique identifier of a particular user. For example, the optimization engine 199 may assign a user ID to a human user "User 1" that is different from the user ID that is assigned to the human user "user 13," as well as an any other human user that is assigned a user ID by the optimization engine 199.

In some implementations, the user ID may be stored on the non-transitory memory of the optimization server 103 (e.g., the memory 227 described below with reference to FIG. 2). For example, the user ID may be stored in a data structure that includes one or more sets of user preferences data 112 that are each associated with a particular user ID.

In some implementations, a data structure of the optimization server 103 may include a plurality of different sets of user preferences data 112 that are indexed based on the user IDs so that each set of user preferences data 112 may be retrieved from the data structure by the optimization engine 199 querying the data structure using a user ID, which will cause the data structure to return a set of user preferences data 112 this is associated with the user ID included in the query.

In some implementations, the optimization engine 199 may include code and routines that may be operable, when executed by the processor of the optimization server 103, to cause the processor to build the data structure including the plurality of sets of user preferences data 112 indexed based on a plurality of user IDs assigned by the optimization engine 199.

The simulation tool set 114 may include one or more Modelica-based modeling tools. The one or more Modelica-based modeling tools may build one or more digital models that may cause a game engine included in the simulation tool set to generate a simulation including a digital version of a particular model of a vehicle (such as the vehicle 123) being operated in whole or in part by the ADAS system of the vehicle while driving on a digital roadway including one or more driving scenarios. In some implementations, the digital models generated by the one or more Modelica-based modeling tools of the simulation tool set 114 may include one or more digital models for generating digital versions of: the vehicle 123; one or more roadway systems; and one or more dynamic or static objects included in scenarios occurring in relation to the digital versions of the vehicle 123 and the roadway systems.

Modelica is an object-oriented, declarative, multi-domain modeling language for component-oriented modeling of complex systems that is developed by the Modelica Association. A complex system may include a system containing one or more of the following: one or more mechanical subcomponents; one or more electrical subcomponents; one or more electronic subcomponents; one or more hydraulic subcomponents; one or more thermal subcomponents; one or more control subcomponents; one or more electric power subcomponents; and one or more process-oriented subcomponents. An example of a complex system which may be modeled using Modelica may include the vehicle 123 including the ADAS system 180.

The simulation tool set 114 may include the Modelica Standard Library that contains approximately 1360 generic model components and 1280 functions in various domains.

In some implementations, the simulation tool set 114 may include one or more of the following Modelica-based modeling tools: Dymola developed by Dassault Systemes AB of Sweden; OpenMETA developed by Vanderbilt University; Simulink developed by MathWorks of Natick, Mass.; and ADAMS developed by MSC Software Corp. of Newport Beach Calif.

The simulation tool set 114 may use one or more of the Modelica-based modeling tools to generate a digital model that represents a particular vehicle model (e.g., the vehicle 123) that includes an ADAS system 180. As used here, the term "vehicle model" may mean a particular model of a vehicle such as a "2015 Toyota Corolla." For example, the vehicle 123 may be a 2015 Toyota Corolla and the simulation tool set 114 may generate a digital model to represent the 2015 Toyota Corolla within a simulation. The term "digital model" may mean a digital model that represents a particular vehicle model in the simulation. The digital model may be stored in a non-transitory memory of the optimization server 103 as digital data. This digital data is not depicted in FIG. 1A but may be referred to as "digital model data."

In some implementations, one or more of the Modelica-based modeling tools included in the simulation tool set 114 may include one or more parametric exploration tools ("PET" if singular, or "PETs" if plural).

In some implementations, one or more of the Modelica-based modeling tools included in the simulation tool set 114 may include one or more design space exploration ("DSE") tools.

In some implementations, the simulation tool set 114 may also include one or more game engines. A game engine included in the simulation tool set 114 may include the Unity game engine developed by Unity Technologies of San Francisco, Calif., or some other game engine. The simulation tool set 114 may use the game engine to run one or more simulations for measuring the performance of a digital version of the ADAS system included in a digital version of a vehicle that is tested in one or more of the simulations generated by the game engine. For example, the game engine may generate a simulation including one or more roadway systems upon which a digital version of the vehicle travels. The optimization engine 199 may include code and routines that, when executed by the processor of the optimization server 103, cause the processor to record data that describes the operation of the digital version of the ADAS system In some implementations, the game engine of the simulation tool set 114 may include a simulation model library (see, e.g., the simulation model library 399 described below for FIG. 3). The simulation model library may include roadway model data that describes one or more different digital roadway systems that may be included in a simulation provided by the game engine. The roadway model data may describe one or more digital models for the one or more roadways that may be included in the simulation. For example, the roadway model data may describe one or more roadway models that are used by the game engine to generate a digital version of one or more roadways in the simulation.

In some implementations, the simulation tool set 114 may include one or more of the following elements: a simulation model library; a simulation scenarios library.

In some implementations, the simulation model library may include one or more of the following elements: one or more Simulink models; one or more Dymola models; and one or more roadway models.

In some implementations, a Simulink model may include a model for a vehicle control system such as an ADAS system. The Simulink model may be used to simulate a performance of the vehicle control system in an electronic simulation provided by a game engine such as Unity.

In some implementations, a Simulink model may include a model for one or more of the following components of a vehicle: an engine control software; transmission control software; an ADAS system; the software that makes a vehicle autonomous; or any other vehicle control software.

In some implementations, a Simulink model may include one or more parameters relating to the vehicle control software which it models. These one or more parameters may be calibrated so that the model for the vehicle control software is improved following simulation of the vehicle control software by the gaming engine.

In some implementations, a Dymola model may include a vehicle physics model for a vehicle component such as an engine, transmission, suspension, or any other vehicle component which may be modeled by a vehicle physics model. The Dymola model may be used to simulate a performance of a vehicle component in the electronic simulation.

In some implementations, a Dymola model may describe the physical behavior of one or more hardware elements of a vehicle.

For example, a Dymola model may describe an engine of a vehicle and its expected behavior in the physical world. This may be referred to as an "engine model." The engine model may include, for example, a throttle angle value for an input shaft and an output shaft. The engine model may include one or more parameters for the output shaft such as a rotational torque, rotational velocity and other parameters which may describe a physical behavior of an output shaft. These and other parameters associated with the engine may be described by the engine model. The Dymola model for the engine may have an associated Simulink model: the engine control model. In this case, the Simulink engine control model may output a throttle angle command value, and the Dymola engine model receives the throttle angle value from the Simulink engine control model and calculates an output shaft behavior by using one or more physics equations that may use the throttle angle value as an input variable to output the behavior of the output shaft in a particular situation. Accordingly, some parameter values of a Dymola model may be dynamically determined. Other parameters relating to the output shaft such as shaft inertia, number of engine cylinders, etc may be hardcoded by a design engineer (i.e., statically determined). This description relating to a Dymola engine model and output shaft are provided by way of example; other examples are possible.

A physics model as described above for Dymola may be referred to as "plant models" inside of Dymola's software.

In some implementations, each hardware element of the vehicle may include a separate Dymola model (and possibly one or more corresponding Simulink models if the hardware may be controlled). For example, as described above, a Dymola model may include an engine model that models the performance of the engine of a vehicle. Other examples of Dymola models may include one or more of the following: a transmission model; a wheel model; a brake model; or any other model for any other hardware element of a vehicle.

Figure 7:
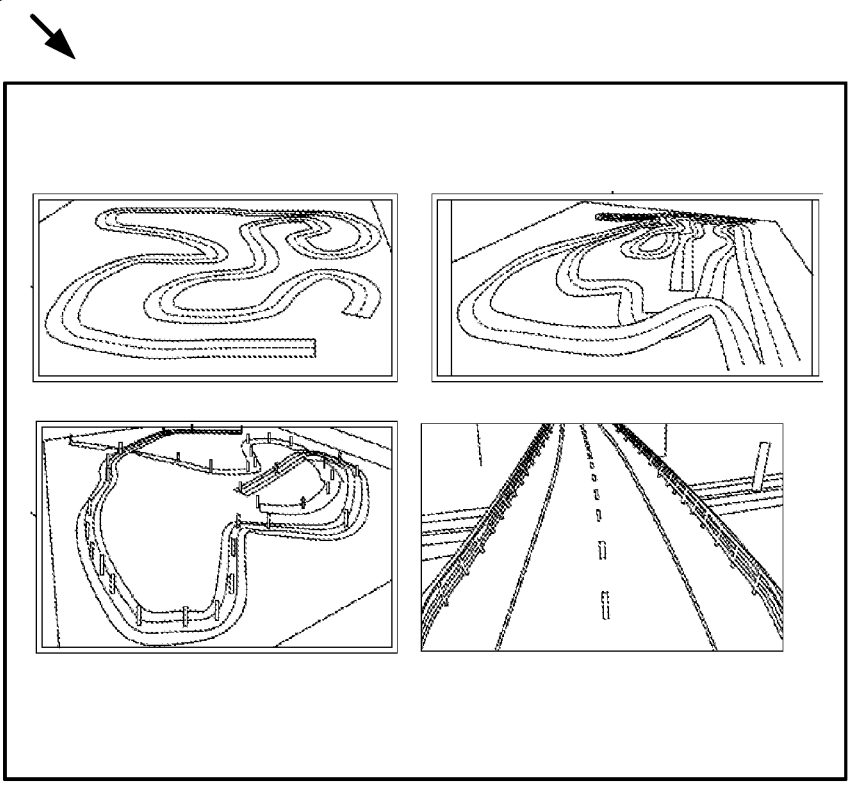
FIG. 7 is a block diagram illustrating an example of a simulation scenario library according to some implementations.

In some implementations, a roadway model may include a model for a roadway system. The roadway model may include one or more roads, traffic signals, or other conventional features of a roadway in the real world. The roadway model may be used to generate an electronic version of the roadway in the electronic simulation. A simulated vehicle may drive on the electronic version of the roadway in the electronic simulation and thereby test the performance of one or more vehicle components such as the ADAS system whose operation is simulated based on a Simulink model. An example of a roadway model according to some implementations is shown in FIG. 7.

In some implementations, the roadway model data may be generated by one or more of the Modelica-based modeling tools included in the simulation tool set 114.

In some implementations, the game engine of the simulation tool set 114 may include a parameter setting library (see, e.g., the parameter setting library 395 described below for FIG. 3). The parameter setting library may include roadway parameter data for each of the roadway models of the simulation model library. The parameter setting library may describe, for each of the roadway models, one or more of the following roadway parameters: speed limit; total number of lanes included in the roadway; total number of right-hand lanes included in the roadway; total number of left-hand lanes included in the roadway; roadway length; land width for each lane included in the roadway; the dividing line striping option for each lane transition (e.g., no dividing line; broken or clashed line; solid double line; solid line or left and broken line on the right; broken line on the left and solid line on the right; double solid line); the edge line for each outside lane; visibility of dividing line options or edge line by automobile sensors such as cameras (e is the dividing line or edge line obscured or old so that is hard to identify by the sensors of an autonomous vehicle) shoulder width; foreslope on the left or right-hand side; roadway cross-slope on the left or right-hand side; placement of curves along the roadway; angle of curves along the roadway; roadway slope inside of curves along the roadway; coefficients of friction along the roadway, transitions from coefficients for friction along the roadway and the placement of these transitions on the roadway, etc. Different roadway systems described by the roadway parameter data may be described by different combinations of roadway parameters.

In some implementations, the roadway parameter data may be an input provided to one or more of the Modelica-based modeling tools included in the simulation tool set 114 for causing the one or more Modelica-based modeling tools to generate the roadway model data describing the one or more roadway models used to generate the simulation.

In some implementations, the simulation provided by the game engine of the simulation tool set 114 may include one or more scenarios. The scenarios may test the operation of the digital version of the ADAS in response to different variables. The scenarios may be described by simulation scenario data that is included in a simulation scenario library (see, e.g., the simulation scenario library 397 described below for FIG. 3).

In some implementations, the scenarios described by the simulation scenario data may include, for example, one or more static or dynamic roadway obstacles such as multiple lanes of travel, other vehicles which may be static or dynamic, traffic signs (which may be static), traffic lights (which may be dynamic), on ramps, exit ramps, roadkill, animals and other static or dynamic objects on the roadway, rain, ice, varying roadway surface frictions, varying degrees of illumination (e.g., day, night, dusk, dawn, cloudy, malfunctioning headlights, or any other condition which may vary the illumination of the vehicle environment), roadway construction, traffic stops, roadway accidents, vehicles or objects behaving erroneously, varying turning angles, varying roadway surface dimensions, varying degrees of performance for vehicle equipment or any other roadway obstacle, whether static or dynamic, which exists in the real world.

Example implementations for generating a simulation are described in U.S. patent application Ser. No. 15/013,936 filed on Feb. 2, 2016 and entitled "Realistic Roadway Virtualization System," the entirety of which is herein incorporated by reference.

The simulation may include a digital version of the ADAS system of the digital version of the vehicle controlling the operation of the digital version of the vehicle, whether whole or in part, while navigating on a digital version of a roadway with one or more roadway obstacles. The simulation may include the digital version of the ADAS system controlling the operation of the digital version of the vehicle, whether whole or in part, with a constraint such as a navigation route (e.g., including a known start point and a known end point) or a schedule including appointments. The game engine may provide dozens, hundreds, thousands or even millions of simulations over hundreds, thousands or even millions of simulated miles of travel, with varying scenarios and varying roadway systems being included in the scenario. The game engine (or the optimization engine 199) may monitor and record data that describes the performance of the digital version of the ADAS system of the digital version of the vehicle during these simulations. In this way the optimization engine 199 may generate vehicle characteristics data 110 describing the characteristic operation of the ADAS system of a particular vehicle model.

In some implementations, the optimization engine 199 may use one or more modeling tools and a game engine to determine the vehicle characteristics data 110 for a plurality of different vehicle makes and models. For example, the optimization engine 199 may use one or more of the Modelica-based modeling tools of the simulation tool set 114 to generate a digital model for a particular vehicle model (e.g., a 2015 Toyota Corolla, a 2013 Toyota Prius, etc.) that includes an ADAS system (such as the ADAS system 180). The digital model may be provided to the game engine of the simulation tool set 114. The game engine of the simulation tool set 114 may generate a digital version of the vehicle based on the digital model (e.g., a digital version of the 2015 Toyota Corolla, a digital version of the 2013 Toyota Prius, etc.). The game engine may also generate a digital simulation environment for testing the performance of the digital version of the vehicle (i.e., "a digital simulation"). The digital version of the vehicle may be driven in the simulation environment. The digital simulation may include various realistic driving scenarios. The digital version of the vehicle may be driven in the digital simulation over hundreds, thousands or millions of miles so that the characteristic operation of the ADAS system for the vehicle model may be determined (e.g., the characteristic operation of the ADAS system included in the 2015 Toyota Corolla, the characteristic operation of the ADAS system included in the 2013 Toyota Prius, etc.). In this way, the vehicle characteristic data 110 for that particular vehicle model may be generated and stored in a non-transitory memory (not pictured) of the optimization server 103.

In some implementations, this process may be repeated for each vehicle model that has been assigned a vehicle ID by the optimization engine 199. In this way the vehicle characteristic data 110 for each vehicle that has an assigned vehicle ID may be determined.

The simulation tool set 114 may output the vehicle characteristics data 110 as shown in FIG. 1A. The vehicle characteristics data 110 may be stored in the non-transitory memory of the optimization server 103.

The user preferences data 112 may include digital data that describes one or more preferences for a user for the operation of an ADAS system of a vehicle. For example, the user preferences data 112 may describe whether the user prefers for one or more variables which may be controlled by an ADAS system of a vehicle. Examples of variables may include whether the vehicle travels faster or slower relative to the speed limit or other vehicles in the vehicle environment, whether the vehicle brakes sooner or later relative to an object, event or roadway feature that may include a vehicle braking function, whether the vehicle follows closely behind other vehicles or far away from other vehicles, or any other variable which may be controlled by an ADAS system of a vehicle.

The optimization server 103 may include a non-transitory memory that stores the user preferences data 112 for a plurality of different users. Each set of user preferences data 112 may be indexed in the memory based on the user ID associated with the different users who are associated with the different sets of user preferences data 112. The optimization engine 199 may retrieve the user preferences data 112 for different users based on the user IDs for the different users.

In some implementations, the optimization engine 199 may receive reservation data 198 from the network 105 (e.g., the reservation data 198 was transmitted to the optimization server 103 via the network 105). The reservation data 198 may indicate that a particular user associated with a particular set of user preferences data 112 may have a reservation to drive a particular vehicle model associated with a particular set of vehicle characteristics data 110. The reservation data 198 may include the user ID for the particular user and the vehicle ID for the particular vehicle model.

In some implementations, the optimization engine 199 may retrieve, from the non-transitory memory of the optimization server 103, the user preferences data 112 for a particular user associated with the reservation data 198 based on the user ID included in the reservation data 198. For example, the user preferences data 112 is indexed in a data structure of the optimization server 103 based on user IDs and the optimization engine 199 retrieves the user preferences data 112 for a particular user by querying the data structure using the user ID.

In some implementations, the optimization engine 199 may retrieve, from the non-transitory memory of the optimization server 103, the vehicle characteristics data 110 for the particular vehicle model associated with the reservation data 198 based on the vehicle ID included in the reservation data 198. For example, the vehicle characteristics data 110 is indexed in a data structure of the optimization server 103 based on vehicle IDs and the optimization engine 199 retrieves the vehicle characteristics data 110 for a particular vehicle model by querying the data structure using the vehicle ID.

The user preferences data 112 and the vehicle characteristics data 110 associated with a set of reservation data 198 may be provided as inputs to the optimization engine 199.

The optimization engine 199 may include code and routines that, when executed by a processor of the optimization server 103, cause the processor to generate optimization settings 170 (sometimes referred to herein as "optimization settings data") based on the user preferences data 112 for a particular user and the vehicle characteristics data 110 for a particular vehicle model. The optimization settings 170 may include digital data that describes how the control parameters for an ADAS system for a particular vehicle model should be modified based on one or more preferences of a particular user for the operation of the ADAS system. The optimization settings may be outputted by the optimization engine 199.

The reservation data 198 may describe a time when a particular vehicle model such as vehicle 123 will be operated by a particular user (or otherwise include the user as a passenger). The optimization engine 199 may provide the optimization settings 170 to the customization client 190 of the vehicle 123 via the network 105 prior to the time indicated by the reservation data 198. The customization client 190 may include code and routines that, when executed by a processor of the vehicle, cause the processor to modify the control parameters for the ADAS system 180 based on the optimization settings 170 prior to the time described by the reservation data 198 so that the vehicle 123 is customized for a particular user prior to the time of that user's reservation to operate or travel in the vehicle 123.

The optimization engine 199 is described in more detail below with reference to FIG. 1B and FIGS. 2-9.

In some implementations, the optimization engine 199 may be implemented using hardware including an FPGA or an ASIC. In some other implementations, the optimization engine 199 may be implemented using a combination of hardware and software. The optimization engine 199 may be stored in a combination of the devices (e.g., servers or other devices), or in one of the devices.

Figure 1B:
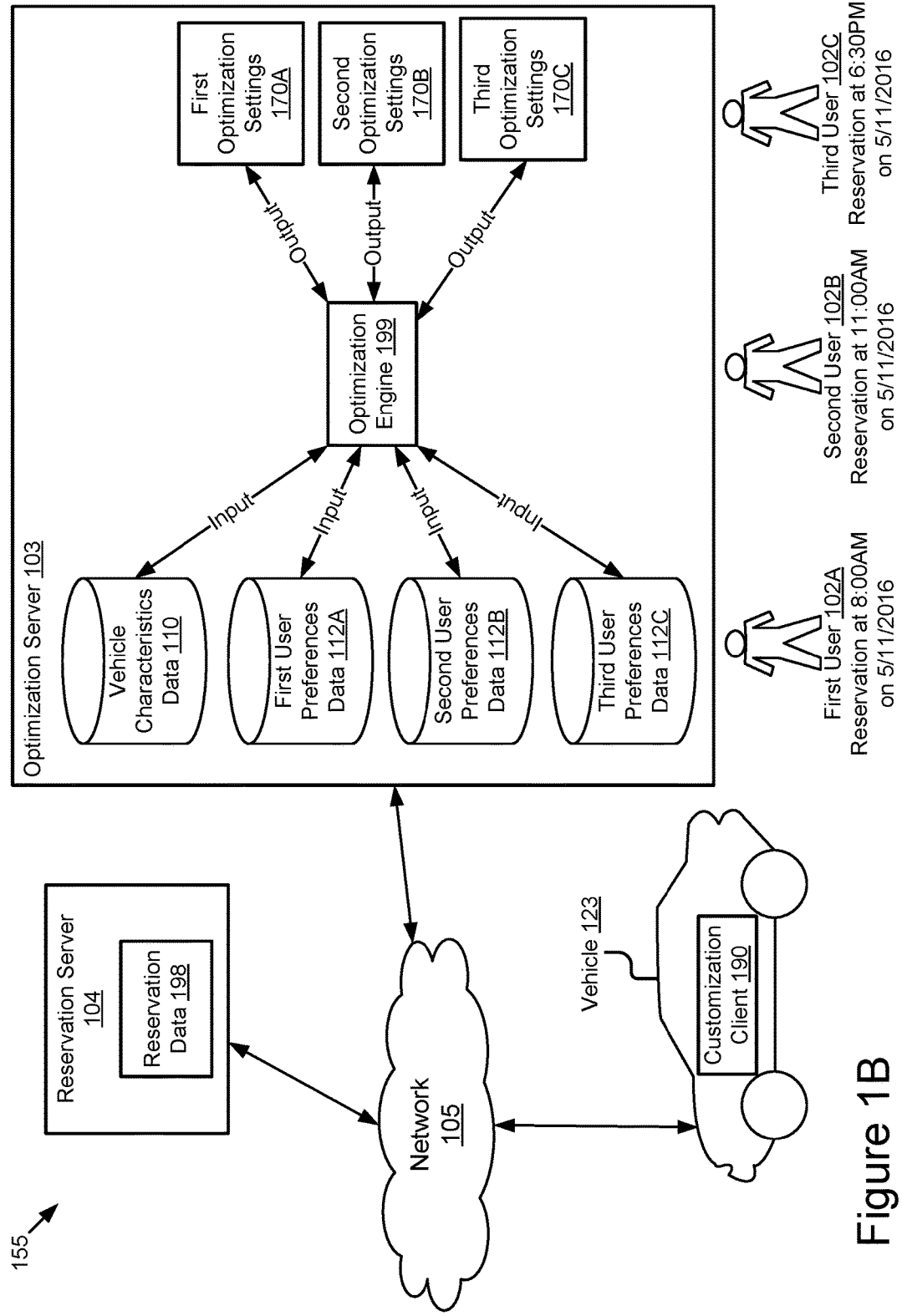
FIG. 1B is a block diagram illustrating an operating environment for an optimization system according to some implementations.

Referring now to FIG. 1B, depicted is a block diagram illustrating an operating environment 155 for an optimization system according to some implementations.

In some implementations, the operating environment 155 may include one or more of the following elements: the reservation server 104; the optimization server 103; and the vehicle 123. The elements are communicatively coupled to one another via the network 105. The following elements were described above with reference to FIG. 1A, and so, these descriptions will not be repeated here: the reservation server 104; the optimization server 103; the vehicle 123; and the network 105.

The operating environment 155 also includes a first user 102A, a second user 102B and a third user 102C, who are different human users. The first user 102A may have scheduled a reservation with the reservation service provided by the reservation server 104 to use the vehicle 123 at 8:00 AM on May 11, 2016. The second user 102B may have scheduled a reservation with the reservation service provided by the reservation server 104 to use the vehicle 123 at 11:00 AM on May 11, 2016. The third user 102C may have scheduled a reservation with the reservation service provided by the reservation server 104 to use the vehicle 123 at 6:30 PM on May 11, 2016.

In some implementations, the optimization engine 199 may receive the reservation data 198 for each of the first user 102A, the second user 102B and the third user 102C.

In some implementations, the optimization server 103 may include three sets of user preferences data 112: a first set of user preferences data 112A for the first user 102A; a second set of user preferences data 112B for the second user 102B; and a third set of user preferences data 112C for the third user 102C.

In some implementations, the first user preferences data 112A may be received by the optimization engine 199 via the network 105 as an element of the reservation data 198 for the first user 102A. The reservation data 198 for the first user 102A may indicate that the first user 102A will use the vehicle 123 at 8:00 AM on May 11, 2016. In some implementations, the optimization engine 199 may generate the first optimization settings 170A for the reservation for the first user 102A based on the vehicle characteristics data 110 for the vehicle 123 reserved by the first user 102A and the first user preferences data 112A for the first user 102A. The optimization engine 199 may provide the first optimization settings 170A to the customization client 190 of the vehicle 123 via the network 105 at a time preceding the reservation time of 8:00 AM so that the customization client 190 may modify the control parameters for the ADAS system of the vehicle 123 prior to the reservation time for the first user 102A.

In some implementations, the second user preferences data 112B may be received by the optimization engine 199 via the network 105 as an element of the reservation data 198 for the second user 102B. The reservation data 198 for the second user 102B may indicate that the second user 102B will use the vehicle 123 at 11:00 AM on May 11, 2016. In some implementations, the optimization engine 199 may generate the second optimization settings 170B for the reservation for the second user 102B based on the vehicle characteristics data 110 for the vehicle 123 reserved by the second user 102B and the second user preferences data 112B for the second user 102B. The optimization engine 199 may provide the second optimization settings 170B to the customization client 190 of the vehicle 123 via the network 105 at a time preceding the reservation time of 11:00 AM so that the customization client 190 may modify the control parameters for the ADAS system of the vehicle 123 prior to the reservation time for the second user 102B.

In some implementations, the third user preferences data 112C may be received by the optimization engine 199 via the network 105 as an element of the reservation data 198 for the third user 102C. The reservation data 198 for the third user 102C may indicate that the third user 102C will use the vehicle 123 at 6:30 PM on May 11, 2016. In some implementations, the optimization engine 199 may generate the third optimization settings 170C for the reservation for the third user 102C based on the vehicle characteristics data 110 for the vehicle 123 reserved by the third user 102C and the third user preferences data 112C for the third user 102C. The optimization engine 199 may provide the third optimization settings 170C to the customization client 190 of the vehicle 123 via the network 105 at a time preceding the reservation time of 6:30 PM so that the customization client 190 may modify the control parameters for the ADAS system of the vehicle 123 prior to the reservation time for the third user 102C.

Figure 2:
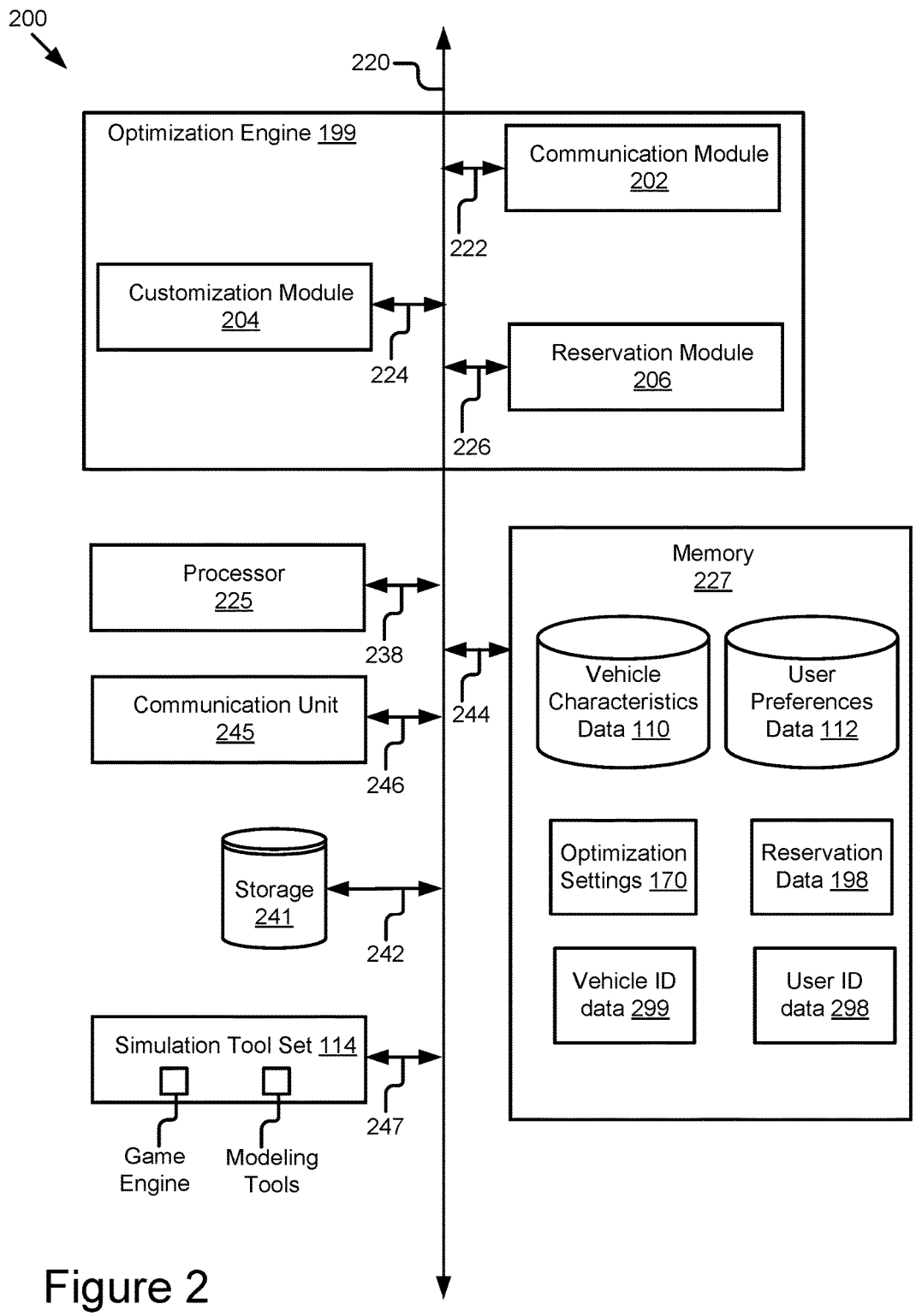
FIG. 2 is a block diagram illustrating an example computer system including an optimization engine according to some implementations.

Referring now to FIG. 2, depicted is a block diagram illustrating an example computer system 200 including an optimization engine 199 according to some implementations.

In some implementations, the computer system 200 may include a special purpose computer system that is programmed to perform one or more steps of a method 300 described below with reference to FIG. 3.

In some implementations, the computer system 200 may include a special-purpose computer system that is programmed to perform one or more steps of a method 400 described below with reference to FIG. 4.

In some implementations, the computer system 200 may include the optimization server 103. In some implementations, the optimization server 103 is a cloud server.

In some implementations, the computer system 200 may include an onboard vehicle computer of the vehicle 123. In some implementations, the computer system 200 may include an electronic control unit, head unit or some other processor-based computing device of the vehicle 123.

The computer system 200 may include one or more of the following elements according to some examples: the optimization engine 199; a processor 225; a communication unit 245; a storage 241; a simulation tool set 114; and a memory 227. The components of the computer system 200 are communicatively coupled by a bus 220.

In the illustrated implementation, the processor 225 is communicatively coupled to the bus 220 via a signal line 238. The communication unit 245 is communicatively coupled to the bus 220 via a signal line 246. The simulation tool set 114 is communicatively coupled to the bus 220 via a signal line 247. The storage 241 is communicatively coupled to the bus 220 via a signal line 242. The memory 227 is communicatively coupled to the bus 220 via a signal line 244.

The simulation tool set 114 was described above with reference to FIG. 1A, and so, that description will not be repeated here.

The processor 225 includes an arithmetic logic unit, a microprocessor, a general purpose controller, or some other processor array to perform computations and provide electronic display signals to a display device. The processor 225 processes data signals and may include various computing architectures including a complex instruction set computer (CISC) architecture, a reduced instruction set computer (RISC) architecture, or an architecture implementing a combination of instruction sets. Although FIG. 2 includes a single processor 225, multiple processors may be included. The processor 225 may include a graphical processing unit. Other processors, operating systems, sensors, displays, and physical configurations may be possible.

The memory 227 stores instructions or data that may be executed by the processor 225. The instructions or data may include code for performing the techniques described herein. The memory 227 may be a dynamic random access memory (DRAM) device, a static random access memory (SRAM) device, flash memory, or some other memory device. In some implementations, the memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2, the memory 227 stores one or more of the following elements: the vehicle characteristics data 110; the user preferences data 112; the optimization settings 170; the reservation data 198; vehicle ID data 299; and user ID data 298. The following elements were described above with reference to FIGS. 1A and 1B, and so, those descriptions will not be repeated here: the vehicle characteristics data 110; the user preferences data 112; the optimization settings 170; and the reservation data 198.

The vehicle ID data 299 may include digital data that describes a vehicle ID or some other unique identifier for a vehicle. For example, the vehicle ID data 299 may be an element of the reservation data 198 that describes which vehicle model is being reserved by a user at a certain time. An example of a vehicle ID may include a vehicle identification number (VIN). Other examples are possible.

The user ID data 298 may include digital data that describes a user ID or some other unique identifier for a user. For example, the user ID data 298 may be an element of the reservation data 198 that describes which user is reserving a vehicle at a certain time.

The communication unit 245 may include hardware that transmits and receives data to and from the network 105. In some implementations, the communication unit 245 includes a port for direct physical connection to the network 105 or to another communication channel. For example, the communication unit 245 includes a USB, SD, CAT-5, or similar port for wired communication with the network 105. In some implementations, the communication unit 245 includes a wireless transceiver for exchanging data with the network 105 or other communication channels using one or more wireless communication methods, including IEEE 802.11, IEEE 802.16, Bluetooth, or another suitable wireless communication method.

In some implementations, the communication unit 245 includes a port for direct physical connection to the network 105 or to another communication channel. For example, the communication unit 245 includes a USB, SD, CAT-5, or similar port for wired communication with the network 105.

In some implementations, the communication unit 245 includes a wireless transceiver for exchanging data with the network 105 or other communication channels using one or more wireless communication methods, including: IEEE 802.11; IEEE 802.16, Bluetooth; EN ISO 14906:2004 Electronic Fee Collection—Application interface EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some implementations, the communication unit 245 may include a full-duplex coordination system as described in U.S. patent application Ser. No. 14/471,387 filed on Aug. 28, 2014 and entitled "Full-Duplex Coordination System."

In some implementations, the communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some implementations, the communication unit 245 includes a wired port and a wireless transceiver. The communication unit 245 also provides other conventional connections to the network 105 for distribution of files or media objects using standard network protocols including TCP/IP, HTTP, HTTPS, and SMTP, millimeter wave, DSRC, etc.

The storage 241 can be a non-transitory storage medium that stores data for providing the functionality described herein. The storage 241 may be a dynamic random access memory (DRAM) device, a static random access memory (SRAM) device, flash memory, or some other memory devices. In some implementations, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated implementation shown in FIG. 2, the optimization engine 199 includes a communication module 202, a customization module 204 and a reservation module 206. These components of the optimization engine 199 are communicatively coupled to each other via the bus 220. In some implementations, components of the optimization engine 199 can be stored in a single server or device. In some other implementations, components of the optimization engine 199 can be distributed and stored across multiple servers or devices.

The communication module 202 can be software including routines for handling communications between the optimization engine 199 and other components of the computer system 200. In some implementations, the communication module 202 can be a set of instructions executable by the processor 225 to provide the functionality described below for handling communications between the optimization engine 199 and other components of the computer system 200. In some implementations, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the computer system 200 or the network 105. For example, the communication module 202 receives, via the communication unit 245, one or more of the following: the reservation data 198; the user preferences data 112; the vehicle ID data 299; and the user ID data 298.

In some implementations, the communication module 202 receives data from components of the optimization engine 199 and stores the data in one or more of the storage 241 and the memory 227. For example, the communication module 202 receives the optimization settings 170 from the customization module 204 and stores the optimization settings 170 in the memory 227.

In some implementations, the communication module 202 may handle communications between components of the optimization engine 199 or the computer system 200.

The customization module 204 can be software including routines for performing one or more of the following steps: receiving the reservation data 198 from the communication module 202; identifying the user ID data 298 and the vehicle ID data 299 from the reservation data 198; retrieving the user preferences data 112 for the user who is associated with the user ID data 298 or the reservation associated with the reservation data 198; retrieving the vehicle characteristics data 110 for the vehicle associated with the vehicle ID or the reservation associated with the reservation data 198; and generating optimization settings 170 based on (1) the vehicle characteristics data 110 for the vehicle associated with the vehicle ID or the reservation described by the reservation data 198 and (2) the user preferences data 112 for the user associated with the user ID or the reservation described by the reservation data 198.

In some implementations, the optimization settings 170 generated by the customization module 204 may be configured to modify the control parameters for the ADAS system of the reserved vehicle associated with the vehicle ID so that the ADAS system operates the reserved vehicle (or controls the operation of the reserved vehicle) in accordance with the user preferences data 112.

In some implementations, the optimization settings 170 generated by the customization module 204 may include new control parameters for the ADAS system of the reserved vehicle that are operable to cause the ADAS system to operate the reserved vehicle (or control the operation of the reserved vehicle) in a manner that conforms to the preferences of the user that has reserved the vehicle (e.g., the user preferences data 112 associated with the user ID).

In some implementations, the customization module 204 may include software for assigning vehicle IDs to different vehicles which the customization module 204 may customize as described herein by generating the optimization settings 170. An aggregate of the vehicle ID data 299 stored in the memory 227 may include an inventory of the vehicles which may be customized by the optimization engine 199.

In some implementations, the customization module 204 can be stored in the memory 227 of the computer system 200 and can be accessible and executable by the processor 225. The customization module 204 may be adapted for cooperation and communication with the processor 225 and other components of the computer system 200 via signal line 224.

The reservation data 198 may describe a start time for the reservation of a user. The reservation module 206 can be software including routines for performing one or more of the following steps: receiving the reservation data 198 from the communication module 202; identifying the start time for a reservation; monitoring the current time; and providing the optimization settings 170 associated with a particular reservation to a customization client 190 of a reserved vehicle associated with the reservation prior to the star time for the reservation. For example, the reservation module 206 may cause the communication unit 245 to provide the optimization settings 170 to a network 105 for transmission to the customization client 190 of a reserved vehicle prior to the start time for the reservation.

In some implementations, the transmission of the optimization settings 170 may be configured to arrive at the customization client 190 in sufficient time to enable the customization client 190 to modify the control parameters for the ADAS system of the reserved vehicle. For example, the transmission may be configured so that the customization client 190 receives the optimization settings 170 at substantially 10 minutes prior to the start time of the reservation.

In some implementations, the reservation module 206 can be stored in the memory 227 of the computer system 200 and can be accessible and executable by the processor 225. The reservation module 206 may be adapted for cooperation and communication with the processor 225 and other components of the computer system 200 via signal line 226.

Referring now to FIG. 3, depicted is a flowchart of an example method 300 for determining vehicle characteristic data according to some implementations.

In some implementations, the method 300 may be executed offline. For example, the simulation tool set 114 of the computer system 200 may execute one or more steps of the method 300 offline. "Offline" may include a period of time prior to accepting reservations.

At step 301, a determination may be made regarding new field data has been received by the optimization server. New field data may include digital data that describes one or more of the following: a vehicle ID; a performance of an ADAS system for a vehicle model associated with the vehicle ID in a particular scenario; sensor data that describes one or more physical measurements that describe some or all aspects of the particular scenario; and sensor data that describes some or all aspects of the roadway system associated with the particular scenario. For example, the new filed data may describe how the ADAS system for a 2015 Toyota Corolla operated while driving on a feeder road in wet, foggy conditions where objects on the roadway were difficult to detect by the vehicle sensors that aid the ADAS system in object detection.

In some implementations, the new field data may include data that is used by one or more of the Modelica-based modeling tools to generate a digital model that describes the operation of the ADAS system (or an estimate thereof) for the vehicle model in different scenarios.

If new field data is not received at step 301, then the method 300 may proceed to step 304. If new field data is received at step 301, then the method 300 may proceed to step 302.

At step 302 the simulation model library 399 may be updated to include the new field data. The simulation model library 399 may include digital data that describes a set of scenarios that may be included in a simulation provided by the game engine. The simulation model library 399 may include digital data that is used by the one or more Modelica-based modeling tools to generate one or more digital models that are used to provide the simulation.

At step 304 a determination may be made regarding whether new digital model data, new scenario data or new parameter settings are present. For example, the new field data may result in new digital model data, new scenario data or new parameter settings being present.

Alternatively, new filed data may not have been present at step 301 and the new digital model data, new scenario data or new parameter settings may be present for some other reason. For example, the new digital model data, new scenario data or new parameter settings may be present as a result of a new vehicle ID being assigned to a vehicle which is newly supported for customization by the optimization engine 199.

If no new digital model data, new scenario data or new parameter settings are present at step 304, then the method 300 may proceed to step 307.

If new digital model data, new scenario data or new parameter settings are present at step 304, then the method 300 may proceed to step 306.

At step 305 one or more simulations may be executed. For example, a simulation may be executed to determine new vehicle characteristics data 110 based on the new filed data, or the presence of the new digital model data, new scenario data or new parameter settings.

At step 306, a determination may be made regarding whether all the simulations have been completed. For example, a plurality of simulation may need to be ran in order to generate the new vehicle characteristics data 110 associated with the new filed data.

If the simulations have not been completed, then the method 300 may proceed to step 306.

If the simulations have been completed, then the method 300 may proceed to step 307.

At step 307, metrics or surrogate functions may be calculated. For example, execution of the simulations at steps 305 and 306 may result in new metrics or new surrogate functions for the inclusion in the vehicle characteristics data 110 for the vehicle model associated with the new filed data.

At step 309, the metrics or surrogate functions may be stored in the vehicle characteristics data 110. For example, the metrics or surrogate functions may be stored in the vehicle characteristics data 110 associated with the vehicle ID associated with the new filed data.

Figure 4:
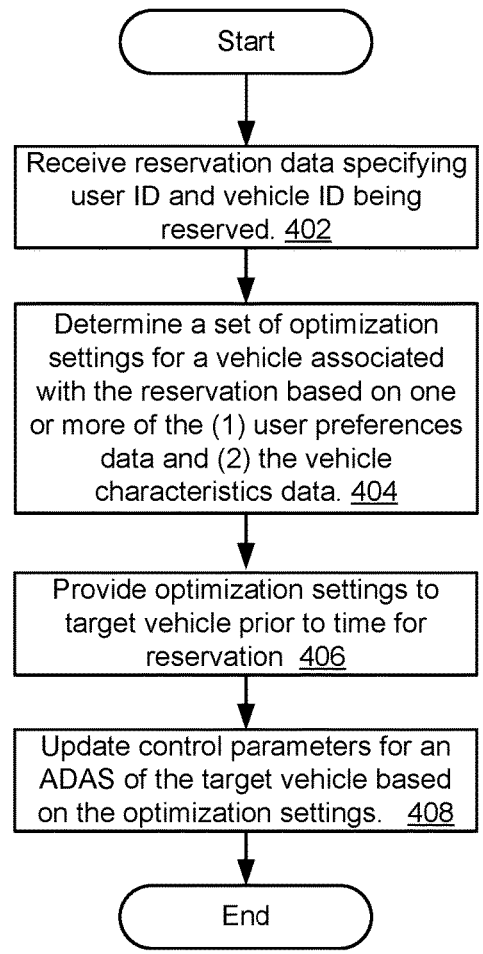
FIG. 4 is a flowchart of an example method for updating one or more control parameters for an ADAS system according to some implementations.

Referring now to FIG. 4, depicted is a flowchart of an example method 400 for updating one or more control parameters for an ADAS system according to some implementations.

In some implementations, the method 400 may be executed during a runtime. For example, the optimization engine 199 and the customization client 190 may execute one or more steps of the method 400 during runtime. "Runtime" may include a period of time after reservations are being accepted.

At step 402, reservation data may be received. The reservation data may

At step 404, a set of optimization settings for a vehicle associated with a reservation may be determined.

At step 406, the optimization settings may be provided to a target vehicle prior to the time of the reservation. The target vehicle may include the vehicle which is reserved by the reservation.

At step 408, the control parameters for an ADAS system of the target vehicle may be updated based on the optimization settings.

Referring now to FIG. 5, depicted is a block diagram illustrating an example of user preference data 112 according to some implementations. Here, the ADAS system may include an automatic cruise control ("ACC") system. Other examples of user preference data are possible. The user preference data 112 may describe any user preference for modifying any variables that are present in the control parameters of an ADAS system of a vehicle.

Figure 6:
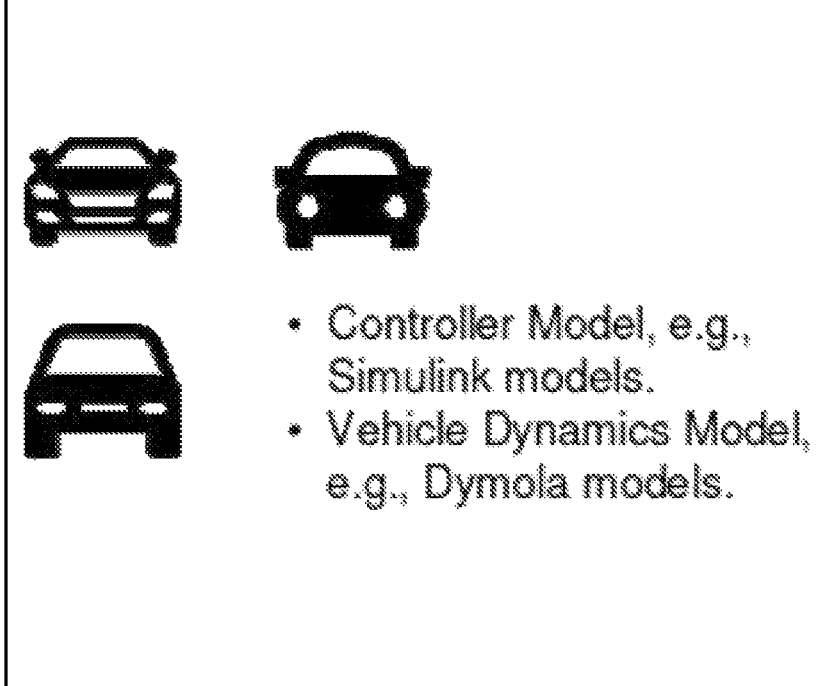
FIG. 6 is a block diagram illustrating an example of a simulation model library according to some implementations.

Referring now to FIG. 6, depicted is a block diagram illustrating an example of a simulation model library 399 according to some implementations. The simulation model library 399 may include, for example, one or more Simulink models or Dymola models. A Simulink model may include, for example, a controller model. A Dymola model may include, for example, a vehicle dynamics model.

Referring now to FIG. 7, depicted is a block diagram illustrating an example of a set of roadway models 700 according to some implementations. The roadway models 700 may include, for example, one or more city roads or highway systems as shown in FIG. 7. The one or more city roads or highways may be generated inside of a game engine such as Unity.

The simulation scenario library 397 may describe examples of scenarios that may playout on the roadway environment provided by the roadway models 700. For example, a vehicle, pedestrian or other dynamic virtual objects present on the roadway that may behave erroneously and provide an obstacle to be avoided by the ADAS system of the vehicle being tested. Examples of a simulation scenario library 397 are described in U.S. patent application Ser. No. 15/085,664 filed on Mar. 30, 2016 and entitled "Dynamic Virtual Object Generation for Testing Autonomous Vehicles in Simulated Driving Scenarios," the entirety of which is hereby incorporated by reference.

Figure 8:
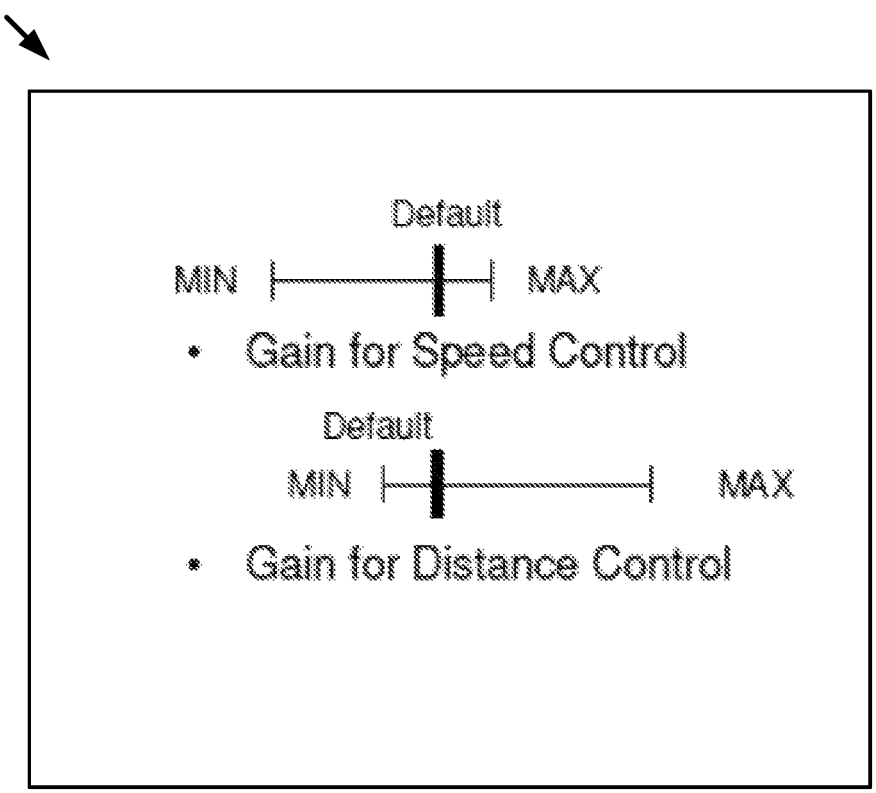
FIG. 8 is a block diagram illustrating an example of a parameter setting library for a particular vehicle model according to some implementations.

Referring now to FIG. 8, depicted is a block diagram illustrating an example of a parameter setting library 395 for a particular vehicle model according to some implementations. In the depicted example of FIG. 8, the parameter settings may control the gain for speed or distance control. The parameter setting for the gain for speed may include how quickly a vehicle accelerates. The parameter setting for gain for distance control may include how quickly a vehicle accelerates when another object such as another vehicle is located ahead of the accelerating vehicle. This the slower the acceleration, the greater the distance of separation may be between the two vehicles.

Referring now to FIG. 9, depicted is a block diagram illustrating an example of reservation data 198 according to some implementations.

The reservation data 198 may include one or more of the following: a vehicle ID; a user ID; a reservation time (e.g., a start time and optionally an end time); and, optionally, the user preferences for the operation of the ADAS system included in the reserved vehicle identified by the vehicle ID.

Referring now to FIG. 1A, one or more of the following devices may be a communication device: a vehicle 123; and a optimization server 103. Regarding U.S. patent application Ser. No. 14/471,387 filed on Aug. 28, 2014 and entitled "Full-Duplex Coordination System," in a half-duplex communication system, a first communication device currently transmitting data to a second communication device is not capable of simultaneously receiving data from the second communication device. If the second communication device has data to transmit to the first communication device, the second communication device needs to wait until the first communication device completes its data transmission. Only one communication device is allowed to transmit data at one time in the half-duplex communication system.

In a standard IEEE 802.11 Wireless Local Area Network (WLAN), communication devices may compete for access to a wireless channel based on the Carrier Sense Multiple Access with Collision Avoidance (CSMA/CA) Medium Access Control (MAC) protocol. The IEEE 802.11 MAC protocol requires that only one communication device may use the wireless channel to transmit data at one time. If two or more communication devices transmit data over the wireless channel at the same time, a collision occurs. As a result, only the communication device that currently gains access to the wireless channel may use the wireless channel to transmit data. Other communication devices having data to transmit need to monitor the wireless channel and may compete for access to the wireless channel when the wireless channel becomes idle again.

According to one innovative aspect of the subject matter described in this disclosure, the vehicle 123, the optimization engine 199 and other communication devices as described above may include a full duplex coordination system for implementing full-duplex wireless communications. The full duplex coordination system may include a processor and a memory storing instructions that, when executed, cause the full duplex coordination system to: create, at a first communication device (such as the optimization engine 199, etc.), first data (such as the optimization settings 170) to transmit to a second communication device (such as a the customization client 190 or the vehicle 123, etc.); switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data (such as any combination of the data stored on the memory 227) from the second communication device using the wireless channel.

According to another innovative aspect of the subject matter described in this disclosure, a full duplex coordination system for implementing full-duplex wireless communications includes a processor and a memory storing instructions that, when executed, cause the full duplex coordination system to: receive a first portion of first data (such as any combination of the data stored on the memory 227) from a first communication device via a wireless channel; determine that a second communication device is a single destination of the first data based on the first portion of the first data; determine that the second communication device has second data (such as any combination of the data stored on the memory 227) to transmit to the first communication device; determine that the first communication device has full-duplex communication capability; switch a half-duplex operation mode of the second communication device to a full-duplex operation mode to activate the full-duplex operation mode of the second communication device; and transmit, in the full-duplex operation mode of the second communication device, the second data to the first communication device while simultaneously receiving a remaining portion of the first data from the first communication device using the wireless channel.

In general, another innovative aspect of the subject matter described in this disclosure may be embodied in methods that include: creating, at a first communication device, first data to transmit to a second communication device; switching a half-duplex operation mode of the first communication device to a full-duplex operation mode to activate the full-duplex operation mode of the first communication device; transmitting a first portion of the first data from the first communication device to the second communication device using a wireless channel; and transmitting, in the full-duplex operation mode of the first communication device, a remaining portion of the first data to the second communication device while simultaneously receiving second data from the second communication device using the wireless channel.

Yet another innovative aspect of the subject matter described in this disclosure may be embodied in methods that include: receiving a first portion of first data from a first communication device via a wireless channel; determining that a second communication device is a single destination of the first data based on the first portion of the first data; determining that the second communication device has second data to transmit to the first communication device; determining that the first communication device has full-duplex communication capability; switching a half-duplex operation mode of the second communication device to a full-duplex operation mode to activate the full-duplex operation mode of the second communication device; and transmitting, in the full-duplex operation mode of the second communication device, the second data to the first communication device while simultaneously receiving a remaining portion of the first data from the first communication device using the wireless channel.

Another innovative aspect of the subject matter described in this disclosure may be embodied in methods that include: determining first data to transmit from a first communication device to a second communication device; and transmitting, from the first communication device that operates in a full-duplex operation mode, the first data to the second communication device while simultaneously receiving second data from the second communication device using a common wireless channel.

Another innovative aspect of the subject matter described in this disclosure may be embodied in methods that include: receiving, from a first communication device, first data at a second communication device via a wireless channel; determining second data to transmit from the second communication device to the first communication device responsive to receiving at least a portion of the first data; and transmitting, from the second communication device that operates in a full-duplex operation mode, the second data to the first communication device using the wireless channel while simultaneously receiving the first data from the first communication device.

Another innovative aspect of the subject matter described in this disclosure may be embodied in methods that include: determining, at a first communication device, first data to transmit to a second communication device; switching the first communication device from a half-duplex operation mode to a full-duplex operation mode; transmitting, in the full-duplex operation mode of the first communication device, the first data to the second communication device while simultaneously receiving second data from the second communication device using the wireless channel; and switching the full-duplex operation mode of the first communication device to the half-duplex operation mode responsive to a determination that transmission of the first data completes.

Another innovative aspect of the subject matter described in this disclosure may be embodied in methods that include: receiving, from a first communication device, first data at a second communication device via a wireless channel; determining that the second communication device has second data to transmit to the first communication device; switching the second communication device from a half-duplex operation mode to a full-duplex operation mode; transmitting, in the full-duplex operation mode of the second communication device, the second data to the first communication device while simultaneously receiving the first data from the first communication device using the wireless channel; and switching the full-duplex operation mode of the second communication device to the half-duplex operation mode responsive to a determination that transmission of the second data completes.

Other aspects include corresponding methods, systems, apparatus, and computer program products for these and other innovative aspects.

These and other implementations may each optionally include one or more of the following operations and features. For instance, the features include: the first data including a first packet and the first portion of the first data including a header portion of the first packet; the remaining portion of the first data including a payload portion and a trailer portion of the first packet; determining that the second communication device is a single destination of the first data; activating the full-duplex operation mode of the first communication device responsive to the second communication device being the single destination of the first data; the first communication device and the second communication device being communication devices in a wireless local area network; determining that the first communication device operates in a regulated spectrum where full-duplex communication capability is required; receiving device registry data associated with the first communication device; determining that the first communication device has full-duplex communication capability based on the device registry data; and determining that the first communication device has full-duplex communication capability based on a capability indication field in the first portion of the first data, the capability indication field including data describing whether the first communication device has full-duplex communication capability.

For instance, the operations include: determining that the wireless channel is idle; and accessing the wireless channel for data communication between the first communication device and the second communication device based on a channel access rule.

The disclosure is particularly advantageous in a number of respects. For example, the system described herein is capable of achieving a higher throughput and a faster communication speed using full-duplex communication technologies rather than using half-duplex communication technologies. The full-duplex communication may be implemented between vehicles (e.g., communication systems installed in a vehicle 123 such as is depicted in FIG. 1A) or other communication devices that have full-duplex communication capability. In another example, the system coordinates communication between communication devices in a distributed way without using a central coordinator. The system determines a pair of communication devices and coordinates simultaneous transmission of data between the pair of communication devices so that the pair of communication devices may transmit data to each other simultaneously using the same wireless channel. Meanwhile, other communication devices may not transmit data over the wireless channel to avoid collision. The advantages of the system described herein are provided by way of example, and the system may have numerous other advantages.

The disclosure includes a system and method for implementing full-duplex wireless communications between communication devices. A full-duplex coordination system may include a processor and a memory storing instructions that, when executed, cause the full-duplex coordination system to: create, at a first communication device, first data to transmit to a second communication device; switch a half-duplex operation mode of the first communication device to a full-duplex operation mode to activate the full-duplex operation mode of the first communication device; transmit a first portion of the first data from the first communication device to the second communication device using a wireless channel; and transmit, in the full-duplex operation mode of the first communication device, a remaining portion of the first data to the second communication device while simultaneously receiving second data from the second communication device using the wireless channel.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present implementations can be described above primarily with reference to user interfaces and particular hardware. However, the present implementations can apply to any type of computer system that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present implementations of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some preferred implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method of a vehicle including an Advanced Driver Assistance System ("ADAS system") and a communication unit, the method comprising:
   receiving, by the communication unit of the vehicle, a wireless message from a wireless network, wherein the wireless message includes optimization settings data describing how to modify an operation of the ADAS system of the vehicle based on (1) one or more preferences of a first user for the operation of the ADAS system and (2) a characteristic behavior of the ADAS system as determined based on one or more digital simulations including a digital version of the vehicle, wherein the wireless message is transmitted to the vehicle responsive to the first user reserving the vehicle for their use; and
   modifying, by a processor of the vehicle, one or more control parameters of the ADAS system based on the optimization settings data so that the operation of the ADAS system conforms with the one or more preferences of the first user.

2. The method of claim 1, wherein the wireless message is received via dedicated short range communication.

3. The method of claim 1, wherein the optimization settings data include one or more new control parameters for the ADAS system and modifying the one or more control parameters of the ADAS system includes replacing the one or more control parameters of the ADAS system with the one or more new control parameters.

4. The method of claim 1, wherein the one or more control parameters are modified based on the one or more preferences of the first user including a preference for a velocity of the vehicle.

5. The method of claim 1, wherein the one or more control parameters are modified based on the one or more preferences of the first user including a-preference for an acceleration of the vehicle.

6. The method of claim 1, wherein the one or more control parameters are modified based on the one or more preferences of the first user including a preference for a braking of the vehicle.

7. The method of claim 1, wherein the one or more control parameters are modified based on the one or more preferences of the first user including a preference for a deceleration of the vehicle.

8. The method of claim 1, wherein the one or more control parameters are modified based on the one or more preferences of the first user including a preference for a separation distance of the vehicle relative to another object on a roadway being traveled by the vehicle.

9. The method of claim 1, wherein the ADAS system is an adaptive cruise control system.

10. The method of claim 1, wherein the ADAS system is an automatic parking system.

11. The method of claim 1, wherein the ADAS system is an emergency driver assistant.

12. The method of claim 1, wherein the ADAS system is a collision avoidance system.

13. The method of claim 1, wherein the ADAS system is a vehicle control system that makes the vehicle an autonomous vehicle.

14. The method of claim 1 further comprising receiving, by the communication unit, a second wireless message including second optimization settings data describing how to modify the operation of the ADAS system of the vehicle based on one or more preferences of a second user who has reserved the vehicle for use by the second user at a time when the vehicle is not reserved for use by the first user, and modifying, by the processor of the vehicle, the one or more control parameters of the ADAS system based on the second optimization settings data so that the operation of the ADAS system conforms with the one or more preferences of the second user for the operation of the ADAS system.

15. The method of claim 1, wherein the first user inputs the one or more preferences for the operation of the ADAS system into an application that is also used for reserving the vehicle.

16. The method of claim 1, wherein the first user reserves the vehicle using a reservation service that is associated with a vehicle rental service that has rented the vehicle to the first user.

17. The method of claim 1, wherein the first user reserves the vehicle using a reservation service is associated with a vehicle sharing service that has rented the vehicle to the first user.

18. The method of claim 1, wherein the first user reserves the vehicle using a reservation service and the optimization settings data are determined by an optimization engine operating on a cloud server that is communicatively coupled to the wireless network and the optimization engine determines the optimization settings based on (1) vehicle characteristics data describing a characteristic operation of the ADAS system for a particular model of the vehicle and (2) user preferences data received by the optimization engine from the reservation service, wherein the user preferences data describes the one or more preferences of the first user for the operation of the ADAS system.

19. A computer program product of a vehicle comprising a non-transitory memory storing computer-executable code that, when executed by a processor of the vehicle, causes the processor to:
  receive a wireless message from a wireless network, wherein the wireless message includes optimization settings data describing how to modify an operation of an ADAS system of the vehicle based on (1) one or more preferences of a user who has reserved the vehicle for their use at a start time and (2) a characteristic behavior of the ADAS system as determined based on one or more digital simulations including a digital version of the vehicle, wherein the one or more preferences describe the user's preferences for the operation of the ADAS system;
  monitor a current time relative to the start time; and
  modify one or more control parameters of the ADAS system based on the optimization settings data so that the operation of the ADAS system conforms with the one or more preferences of the user for the operation of the ADAS system, wherein the one or more control parameters are modified based on the optimization settings data prior to the start time.

20. A system comprising:
  a vehicle including a processor;
  a communication unit communicatively coupled to the processor; and
  an ADAS system communicatively coupled to the processor and the communication unit;
  wherein the ADAS system is operable to control an operation of the vehicle based on one or more control parameters of the ADAS system;
  wherein, responsive to a user reserving the vehicle for their use, the communication unit receives a wireless message from a wireless network;
  wherein the wireless message includes optimization settings data describing how to modify an operation of the ADAS system based on (1) one or more preferences of the user who has reserved the vehicle for their use and (2) a characteristic behavior of the ADAS system as determined based on one or more digital simulations including a digital version of the vehicle;
  wherein the one or more preferences describe the user's preferences for the operation of the ADAS system; and
  wherein, responsive to receipt of the wireless messing including the optimization settings data, the processor modifies the one or more control parameters of the ADAS system based on the optimization settings data so that the operation of the ADAS system conforms with the one or more preferences of the user for the operation of the ADAS system.

* * * * *